(12) United States Patent
Yoshida et al.

(10) Patent No.: US 6,788,436 B1
(45) Date of Patent: Sep. 7, 2004

(54) DEVICE FOR PREVENTING THE DEGENERATION OF A PHOTOGRAPHIC PHOTOSENSITIVE MATERIAL AND IMAGE READING APPARATUS

(75) Inventors: Takashi Yoshida, Kanagawa (JP); Yasunobu Sakaguchi, Kanagawa (JP); Kazuhiko Katakura, Kanagawa (JP); Toshiyuki Inoue, Kanagawa (JP); Takashi Yamamoto, Kanagawa (JP); Tatsuya Konagaya, Kanagawa (JP); Tomonori Nishio, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/329,344

(22) Filed: Jun. 10, 1999

(30) Foreign Application Priority Data

Jun. 12, 1998 (JP) .......................................... 10-165728

(51) Int. Cl.$^7$ ................................................ H04N 1/04
(52) U.S. Cl. ....................... 358/475; 358/487; 358/506; 358/509; 358/406; 358/474; 358/496; 358/483
(58) Field of Search ................................. 358/509, 506, 358/505, 487, 475, 496; 355/404, 30, 401, 110; 396/581; 348/96, 97; 382/274; 352/152; 250/599.29

(56) References Cited

U.S. PATENT DOCUMENTS

| | | | | |
|---|---|---|---|---|
| 3,704,069 A | * | 11/1972 | Kitch | 355/110 |
| 3,762,814 A | * | 10/1973 | Kitch | 355/30 |
| 4,945,383 A | * | 7/1990 | Kobayashi et al. | 355/404 |
| 5,005,043 A | * | 4/1991 | Kobayashi et al. | 355/404 |
| 5,051,775 A | * | 9/1991 | Yamakoshi et al. | 355/72 |
| 5,311,031 A | * | 5/1994 | Gagliardo | 250/559.29 |
| 6,381,001 B1 | * | 4/2002 | Katakura et al. | 355/30 |

* cited by examiner

Primary Examiner—Cheukfan Lee
(74) Attorney, Agent, or Firm—Sughrue Mion, PLLC

(57) ABSTRACT

A flow sensor detects a flow rate of cooling air from a compressor, and a determination is made as to whether or not the detected flow rate is abnormal. A determination is made by a diaphragm position sensor as to whether or not a diaphragm is located at such a critical position that a quantity of light illuminated onto a photographic film is large, possibly resulting in degeneration of a photographic film. A lamp is turned off if the diaphragm is located at the critical position and the flow rate of the cooling air is abnormal.

35 Claims, 17 Drawing Sheets

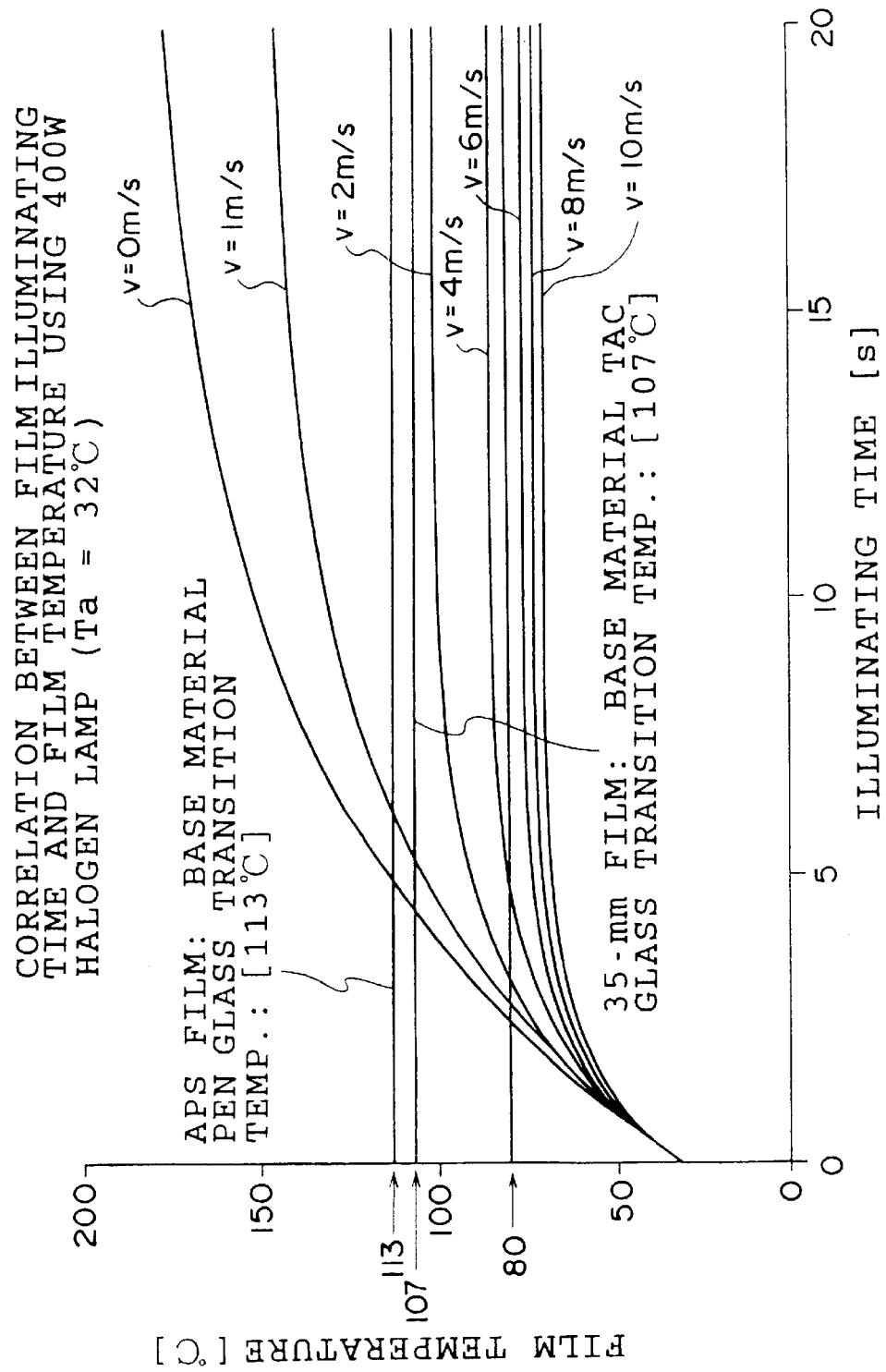

DEVICE FOR PREVENTING THE DEGENERATION OF A PHOTOGRAPHIC PHOTOSENSITIVE MATERIAL AND IMAGE READING APPARATUS

BACKGROUND OF THE INVENTION

1. Field of the Invention

The present invention relates to a device for preventing the degeneration of a photographic photosensitive material and an image reading apparatus, and more particularly to a device for preventing the degeneration of a photographic photosensitive material due to application of light thereto and an image reading apparatus having the device for preventing the degeneration of a photographic photosensitive material.

2. Description of the Related Art

Conventionally, so-called digital photo printers have been proposed in which a photographic film image is fetched by a CCD, and the fetched image is digitally processed and is scanned and exposed onto photographic printing paper.

In this technique, image information recorded on the photographic film is photoelectrically read, and after the image which has been read is converted into a digital signal, the image information is subjected to various image processings so as to be made into image information for recording. An image (latent image) is then recorded on a photosensitive material by scanning and exposing the photosensitive material by means of recording light modulated in correspondence with the image information for recording, is subjected to development processing, and is printed out.

The digital photo printer is capable of freely performing various image processings, including editing such as the synthesis of a plurality of images and the splitting of an image, editing layout of print images such as the synthesis of characters and images, enlargement/reduction, adjustment of color, density, and gradation, conversion between negative photographic film and positive photographic film, and enhancement of the contour. In addition, in prints based on the conventional direct exposure, it is impossible to reproduce all the image density information recorded on the photographic film in view of the density resolution, spatial resolution, color/density reproducibility, and the like. In accordance with digital photo printers, however, it is possible to obtain prints on which the image density information recorded on the photographic film is reproduced virtually by 100%.

Further, in accordance with digital photo printers, since it is possible to record (store) image information recorded on the photographic film and image processing conditions therefor in a memory of the apparatus or in an external memory or external media such as a hard disk, the photographic film serving as an original image is not required at the time of carrying out extra printing or the like. In addition, since it is unnecessary to set the processing conditions again, it is possible to perform operations such as extra printing promptly and efficiently. Other conceivable forms of service include such application services as the editing of digital image data recorded by a digital camera or the like and the outputting of the edited data to a printer, the recording of the photographic film image onto an external medium, and the transmission of the digital image data to a distant site by making use of an internet function.

Such an apparatus is a kind of production facility, so that an apparatus is required which is high in the so-called processing capacity for performing image reading in a short time. Further, the apparatus must finish images recorded on various photographic film types and at various exposure levels to high image quality. Accordingly, with respect to an overexposed negative photographic film, for instance, a greater amount of illumination light is required for the apparatus to be able to read the inputted images as high-quality image data with a fixed processing capacity.

In addition, it is known that visible light components necessary for reading color images in the above-described image reading apparatus include thermal energy. Accordingly, as for a light source for reading the color image, its wavelength regions which can be cut off are naturally limited, and even if the light is radiated by cutting off wavelength components that are unnecessary for reading, it is impossible to obtain a complete heat-insulating effect. Consequently, if a large quantity of light is applied, thermal energy is accumulated in the photographic film original in proportion to the quantity of light, and the rise in the temperature of the photographic film becomes greater than an allowable temperature of the photographic film component materials, causing the degeneration of the photographic film. Incidentally, the degeneration of the photographic film includes temporary degeneration (reversible fading) and permanent degeneration (irreversible fading, deformation of the photographic film base, etc.).

Once irreversible thermal damage is caused in the photographic film, the damaged photographic film is unrepairable, and the function of protecting the photographic film is a function which should be counted as one of the most important tasks in the configuration of the apparatus. In this case, if the illuminating light is merely radiated effectively, there is the possibility of causing thermal damage to the photographic film as described above. Accordingly, it becomes necessary to adopt a means to keep the temperature of the photographic film from becoming high by some method.

However, even if a means for suppressing the temperature rise of the photographic film is provided, in the event that that means has suffered a breakdown, or the photographic film has stayed in the illuminated region for a predetermined time duration or longer as described above due to a breakdown of the transporting device for transporting the photographic film, it is impossible to prevent the degeneration of the photographic film by preventing the overheating of the photographic film.

SUMMARY OF THE INVENTION

The present invention has been devised in view of the above-described circumstances, and it is an object of the present invention to provide a device for preventing the degeneration of a photographic photosensitive material and an image reading apparatus having the device for preventing the degeneration of a photographic photosensitive material which are capable of preventing the degeneration of a photographic photosensitive material illuminated with light.

To this end, in accordance with the present invention, there is provided a device for preventing the degeneration of a photographic photosensitive material, comprising: an illuminating device for illuminating a photographic film; and a detector for detecting an abnormal state leading to the degeneration of the photographic photosensitive material which has been illuminated by the illuminating device. The device further comprises: a reducing device for reducing a quantity of light applied to the photographic photosensitive material if the abnormal state is detected by the detector.

Namely, the illuminating device applies light to the photographic photosensitive material.

The detector detects an abnormal state leading to the degeneration of the photographic photosensitive material to which light has been applied by the illuminating device.

Here, the abnormal state includes a state of flow of cooling air blown onto the photographic photosensitive material, a state of the temperature of cooling air blown onto the photographic photosensitive material, a state of transport of the photographic photosensitive material, a state of the temperature of the photographic photosensitive material, a state of illumination by the illuminating device, and an operational state of the reducing device, and the detector detects at least one of these abnormal states.

It should be noted that the state of the flow rate of cooling air is included in the state of flow of cooling air blown onto the photographic photosensitive material, and in a case where the cooling air is generated by a compressor, the length of the cumulative operating time of the compressor is included. Namely, the compressor has a service life (e.g., 10,000 hours), and as the cumulative operating time approaches this life, a member for example piston and so on is damaged, due to the internal wear and hot air is discharged, there is a case that the compressor itself is destroyed. Accordingly, in a case where the cumulative operating time of the compressor has exceeded a predetermined time period set on the basis of the service life, it can be considered that the state of flow of cooling air is abnormal. A relation between flow of cooling air by the compressor and the length of the cumulative operating time of the compressor is obtained in advance, and the state of flow of cooling air can be judged by the length of the cumulative operating time.

Here, the aforementioned detection of the flow rate of cooling air includes, in addition to direct detection by using a flow sensor, detection of the pressure of cooling air by a pressure sensor and conversion of the pressure into a flow rate. Namely, by obtaining in advance the correlation between the pressure and the flow rate of cooling air, the pressure of cooling air can be converted to the flow rate on the basis of the correlation.

In addition, the aforementioned state of the temperature of the the photographic photosensitive material includes the ambient temperature of a vicinity of the photographic photosensitive material.

Further, the state of illumination by the illuminating device includes the length of cumulative time of light applied to the same location on the photographic photosensitive material. Namely, in a case where a single image recorded on the photographic photosensitive material needs to be read a plurality of times under different conditions (e.g., in a case where image data of a plurality of different resolutions are obtained), light is applied to the relevant single image continuously for a time period corresponding to the number of readings. As the continuous illuminating time (i.e., the cumulative illuminating time) at this time becomes longer, the region where the aforementioned single image has been recorded on the photographic photosensitive material is liable to degenerate. Accordingly, when the aforementioned cumulative illuminating time has exceeded a predetermined time period, it can be considered that the state of illumination by the illuminating device is abnormal.

The reducing device reduces the quantity of light applied to the photographic photosensitive material if the abnormal state is detected by the detector (so-called abnormality processing).

If the abnormal state leading to the degeneration of the photographic photosensitive material to which light has been applied is detected, the quantity of light applied to the photographic photosensitive material is reduced, so that it is possible to prevent the degeneration of the photographic photosensitive material.

Here, a plurality of kinds of abnormal states may be set as objects to be detected by the detector, and the reducing device may reduce the quantity of light applied if at least one of the plurality of kinds of abnormal states is detected by the detector.

It should be noted that, in the same way as described above, the plurality of kinds of abnormal states in this case include states in which the following states are abnormal: the state of flow of cooling air blown onto the photographic photosensitive material, the state of the temperature of cooling air blown onto the photographic photosensitive material, the state of transport of the photographic photosensitive material, the state of the temperature of the photographic photosensitive material, the state of illumination by the illuminating device, and the operational state of the reducing device.

Since the quantity of light applied to the photographic photosensitive material is reduced if at least one of the plurality of kinds of abnormal states is detected, it is possible to reduce the quantity of light applied to the photographic photosensitive material in correspondence with the plurality of kinds of abnormal states, so that the degeneration of the photographic photosensitive material can be prevented more effectively.

The reducing device may reduce the quantity of light applied, by controlling the illuminating device such that the quantity of light applied to the photographic photosensitive material becomes smaller than or equal to a predetermined quantity at which the photographic photosensitive material does not degenerate, or by controlling a transporting device for transporting the photographic photosensitive material in such a manner that the photographic photosensitive material is removed from a region illuminated by the illuminating device.

Here, the reducing device may have a diaphragm device for stopping down the quantity of light applied to the photographic photosensitive material, and may reduce the quantity of light applied if the stopped-down state of the diaphragm device is such that the quantity of light applied to the photographic photosensitive material is in a state of such a quantity that the photographic photosensitive material degenerates, and if the abnormal state is detected by the detector.

This arrangement is provided in view of the fact that if the stopped-down state of the diaphragm device is not such that the quantity of light applied to the photographic photosensitive material is in a state of such a quantity that the photographic photosensitive material degenerates, the possibility of the degeneration of the photographic photosensitive material is small, so that there is no need to reduce the quantity of light applied.

Since the quantity of light applied is reduced only when the stopped-down state of the diaphragm device is such that the quantity of light applied to the photographic photosensitive material is at the level at which the photographic photosensitive material degenerates, reduction processing can be executed by being limited to necessary states.

The detector may detect whether or not the state of flow of cooling air blown onto the photographic photosensitive material and the state of transport of the photographic photosensitive material are abnormal, and the reducing device may reduce the quantity of light applied if the stopped-down state of the diaphragm device is such that the quantity of light applied to the photographic photosensitive material is is in a state of such a quantity that the photographic photosensitive material degenerates, and if it is detected by the detector that at least one of the state of flow and the state of transport is abnormal.

Thus, in the present invention, an arrangement is provided to prevent the following four conditions from occurring simultaneously: illumination by the illuminating device, the state of the diaphragm being such that the quantity of light is greater than or equal to the quantity at which the photographic photosensitive material degenerates, the state of flow being in an abnormal state, and the state of transport being in an abnormal state. It should be noted that an arrangement is also provided to prevent the following three conditions from occurring simultaneously if the quantity of illumination by the illuminating device is large even if the state of flow is appropriate: illumination by the illuminating device, the state of the diaphragm being such that the quantity of light is greater than or equal to the quantity at which the photographic photosensitive material degenerates, and the state of transport being in an abnormal state.

Further, the device may further comprise an alarm for alarming the abnormal state.

Furthermore, the device for preventing the degeneration of a photographic photosensitive material in accordance with the present invention may be applied to an image reading apparatus. Namely, the device for preventing the degeneration of a photographic photosensitive material in accordance with the present invention is applied to an image reading apparatus comprising: a transporting device for transporting the photographic photosensitive material; and a reading device for reading an image recorded on the photographic photosensitive material in a state in which the photographic photosensitive material is being transported by the transporting device.

Namely, a preferable arrangement of the image reading apparatus in accordance with the present invention is as follows. Namely, the image reading apparatus in accordance with the present invention comprises: a transporting device for transporting the photographic photosensitive material, a three-line CCD arrayed in a transporting direction and extending in a direction perpendicular to the transporting direction for reading the image; a lens device serving as a means for projecting the photographic photosensitive material image onto the CCD; and an illuminating device for illuminating the photographic photosensitive material being transported by the transporting device.

A characteristic feature of the present invention lies in that the aforementioned detector and the reducing device are further provided.

Suitable forms of the image reading apparatus in accordance with the present invention include a set up apparatus for determining the exposure conditions of the recorded image after subjecting the image which has been read to image processing, an image processor for subjecting the image which has been read to various image processing, and a recording apparatus for recording (storing) the image which has been read.

It should be noted that, as for the aforementioned three-line CCD, even if area sensors, for example, are used, if they are virtually used in the same way as the three-line CCD, such area sensors will be referred to as the three-line CCD.

In addition, the device for preventing the degeneration of a photographic photosensitive material in accordance with the present invention may also be applied to an exposure apparatus for exposing an image on the photographic photosensitive material onto a photosensitive material.

BRIEF DESCRIPTION OF THE DRAWINGS

FIG. 9 is a graph illustrating the relationship between the film illuminating time for illuminating the photographic film and the temperature of the photographic film;

DESCRIPTION OF THE PREFERRED EMBODIMENTS

Referring now to the accompanying drawings, a detailed description will be given of an embodiment of the present invention.

Figure 1:
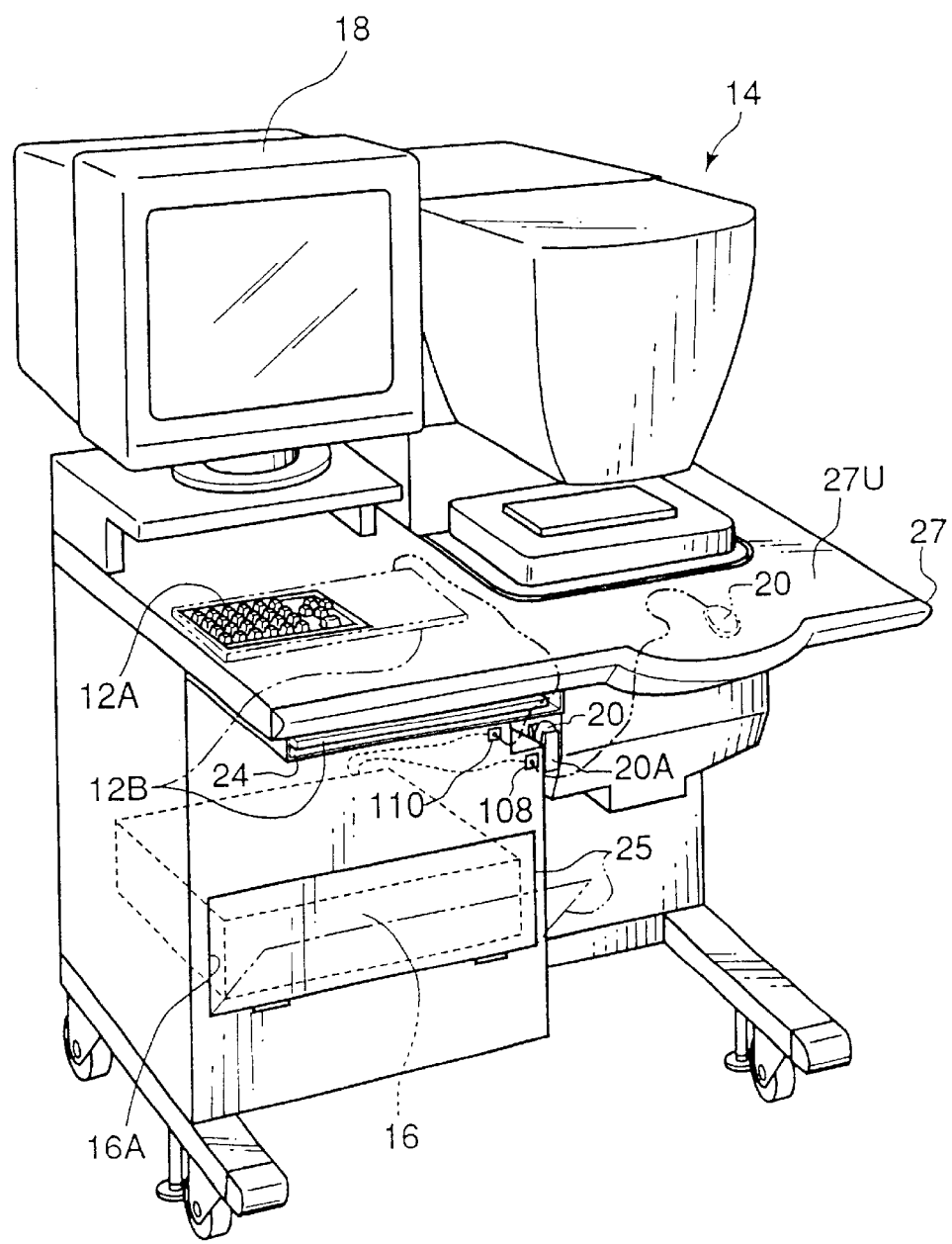
FIG. 1 is an external view of a line CCD scanner.

As shown in FIG. 1, a line CCD scanner (an image reading apparatus having a device for preventing the degeneration of a photographic photosensitive material) 14 in accordance with this embodiment is disposed on a worktable 27 which is provided with an image processing unit 16, a mouse 20, two kinds of keyboards 12A and 12B, and a display 18.

One keyboard 12A is embedded in a working surface 27U of the worktable 27. The other keyboard 12B, when not in use, is accommodated in a drawer 24 of the worktable 27. The keyboard 12B at the time of use is drawn out from the drawer 24 and is placed on top of one keyboard 12A. At this time, the cord of the keyboard 12B is connected to a jack 110 connected to the image processing unit 16.

The cord of the mouse 20 is connected to the image processing unit 16 through a hole 108 provided in the worktable 27. The mouse 20, when not in use, is accommodated in a mouse holder 20A, and the mouse 20 at the time of use is taken out from the mouse holder 20A and is placed on the working surface 27U.

The image processing unit 16 is accommodated in an accommodating portion 16A provided in the worktable 27, and is closed by an opening/closing door 25. Incidentally, the image processing unit 16 can be taken out if the opening/closing door 25 is opened.

The line CCD scanner 14 is for reading film images recorded on a photographic photosensitive material such as a photographic film including a negative film and a reversal film, and its objects to be read can be film images on photographic films, e.g., a 135-size photographic film, a 110-size photographic film, a photographic film with a transparent magnetic layer formed thereon (a 240-size photographic film: so-called APS film), and 120-size and 220-size (Brownie size) photographic films. The line CCD scanner 14 reads the aforementioned film image to be read by means of a line CCD, and outputs image data.

The photographic film referred to herein is a film on which an object has been photographed and which has been subjected to development processing, allowing negative images or positive images to be made visible.

The image processing unit 16, to which the image data outputted from the line CCD scanner 14 is inputted, performs various image processing such as correction with respect to the inputted image data, and outputs recording image data to an unillustrated laser printer section.

Figure 2:
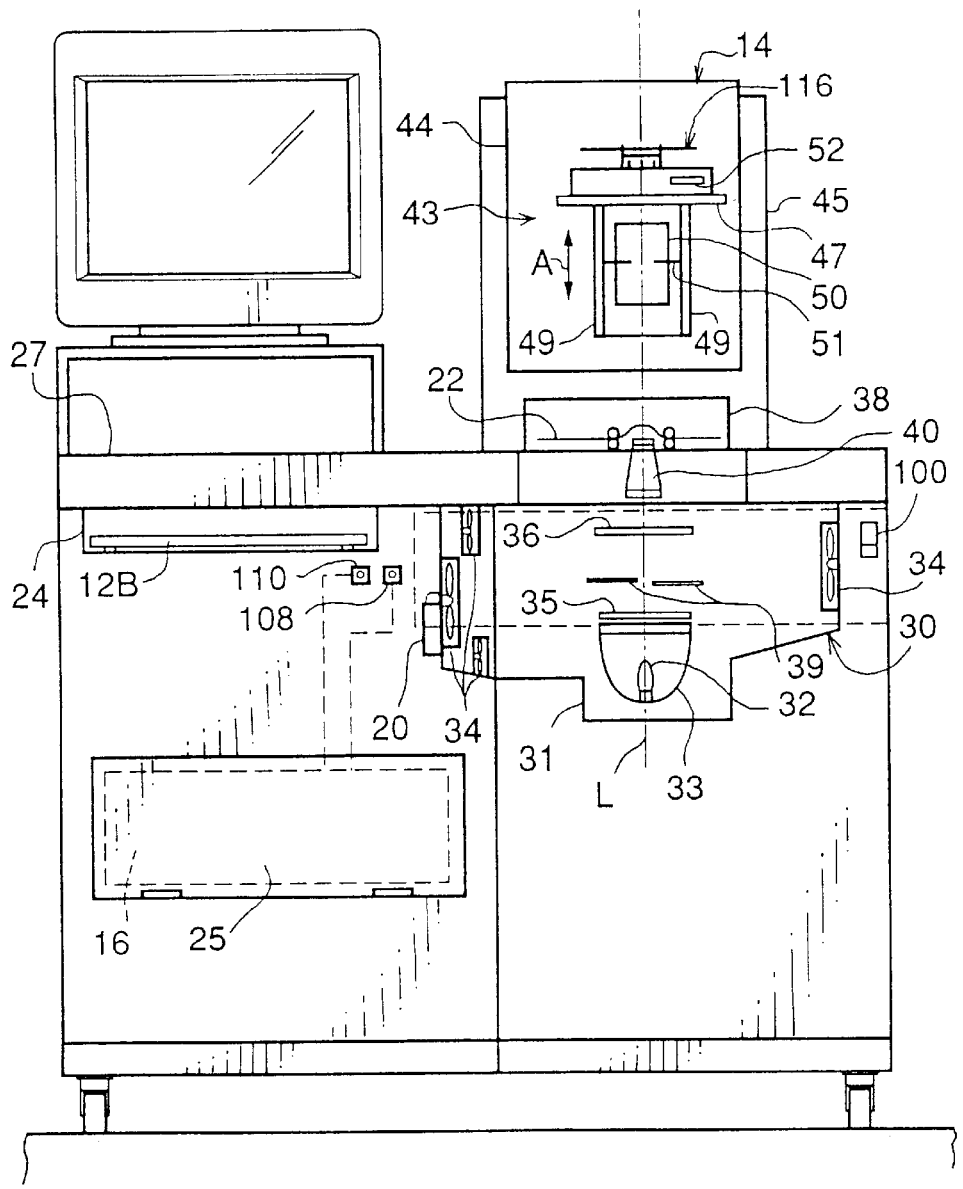
FIG. 2 is a front cross-sectional view of an optical system of the line CCD scanner.
Figure 3:
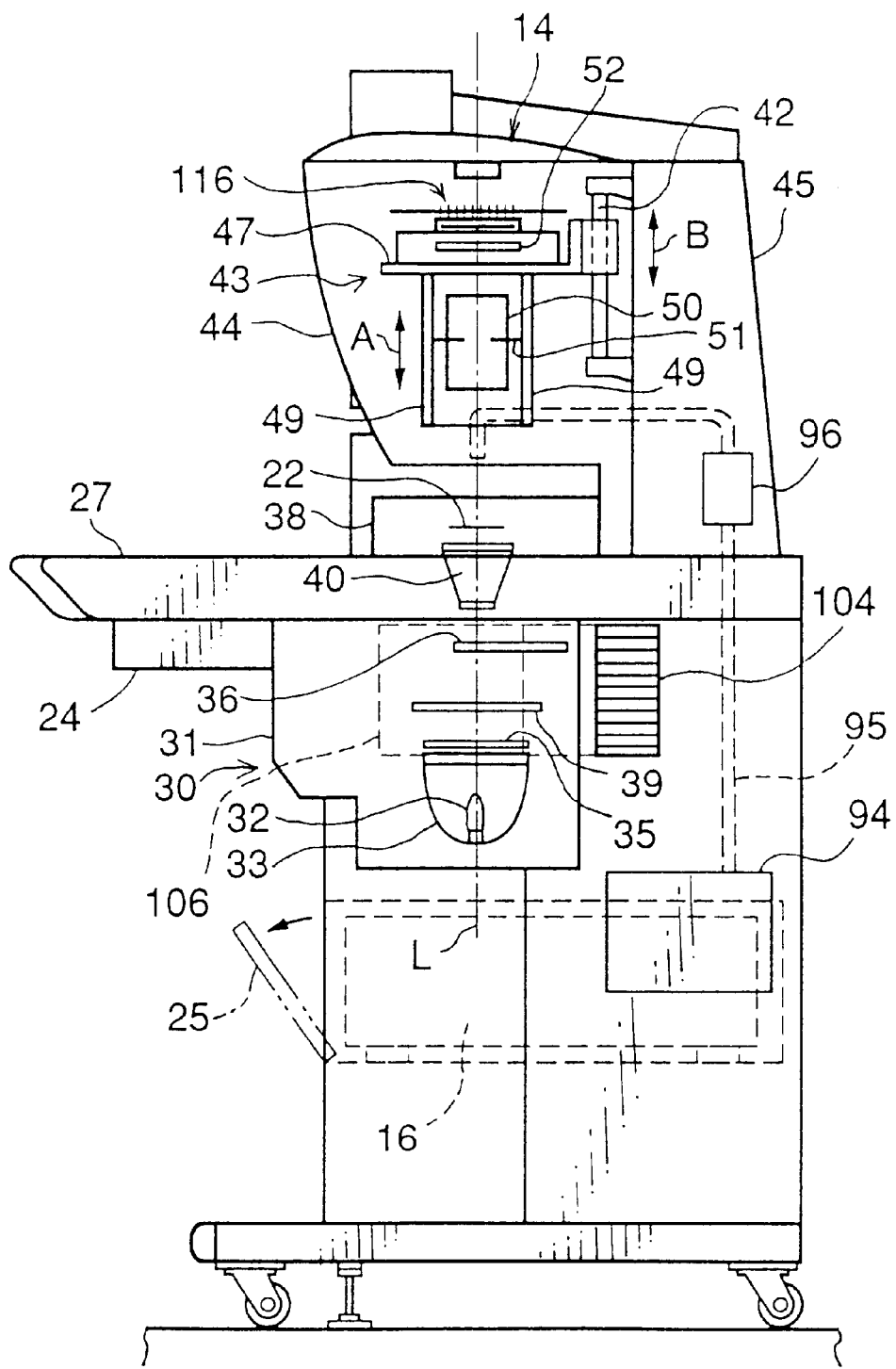
FIG. 3 is a side cross-sectional view of the optical system of the line CCD scanner.

As shown in FIGS. 2 and 3, the optical system of the line CCD scanner 14 is comprised of a light source section 30 disposed below the worktable 27 and serving as an illuminating means; a diffusion box 40 supported by the worktable 27; a film carrier 38 which is set on the worktable 27; and a reading section 43 disposed on the side of the worktable 27 which is away from the light source section 30 with the worktable 27 placed therebetween.

The light source section 30 is accommodated in a metallic casing 31, and a lamp 32 constituted by a halogen lamp, a metal halide lamp, or the like is disposed in the casing 31.

A reflector 33 is provided around the lamp 32, and part of the light emitted from the lamp 32 is reflected by the reflector 33 and is made to emerge in a fixed direction. A plurality of fans 34 are provided on the side of the reflector 33. The fans 34 are operated while the lamp 32 is being lit, and prevents the interior of the casing 31 from becoming overheated.

The following are arranged sequentially on the light-emerging side of the reflector 33 along the optical axis L of the emergent light from the reflector 33: a UV/IR cutoff filter 35 for preventing a rise in the temperature of a photographic film 22 and improving the reading accuracy by cutting off the light of wavelengths in the ultraviolet region and infrared region; a diaphragm 39 for adjusting the quantities of light from the lamp 32 and the reflected light from the reflector 33; and a turret 36 (see FIG. 4B as well) in which are embedded a balance filter 36N for negative film and a balance filter 36P for reversal film for appropriately setting color components of the light reaching the photographic film 22 and the reading section 43 according to the type (negative film and reversal film) of the photographic film.

Figure 4A:
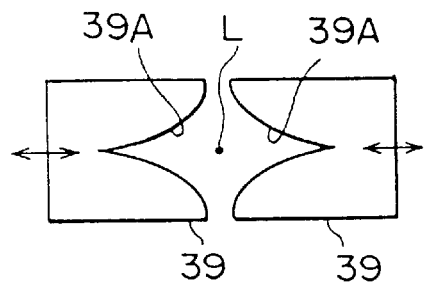
FIG. 4A is a plan view illustrating one example of a diaphragm.

The diaphragm 39 is formed by a pair of plate members (diaphragm plates) arranged with the optical axis L placed therebetween, and the pair of plate members are slidingly movable in such a manner as to approach and move away from each other. As shown in FIG. 4A, each of the pair of plate members of the diaphragm 39 is arranged such that a notch 39A is formed on one end side thereof such that its cross-sectional area along a direction perpendicular to the sliding direction changes continuously from one end side toward the other end side along the sliding direction, and the pair of plate members are disposed such that their sides where the notches 39A are formed face each other.

In the above-described arrangement, either one of the filters (36N, 36P) corresponding to the type of photographic film is positioned on the optical axis L so that the light of desired light components will be obtained, and the quantity of light passing through the diaphragm 39 is adjusted to a desired light quantity by adjusting the position of the diaphragm 39.

The diffusion box 40 is formed in such a shape that its length in the transporting direction of the photographic film 22 which is transported by the film carrier 38 becomes narrower toward its upper portion, i.e., toward the photographic film 22 (see FIG. 2), while its length in a direction perpendicular to the transporting direction (i.e., in the widthwise direction of the photographic film 22) becomes larger toward its upper portion, i.e., toward the photographic film 22 (see FIG. 3). In addition, light diffusion plates (not shown) are respectively provided on the light-incident side and the light-emergent side of the diffusion box 40. It should be noted that although the aforementioned diffusion box 40 is designed for the 135-size photographic film, diffusion boxes (not shown) of shapes corresponding to other photographic films are also available.

The light incident upon the diffusion box 40 is converted to slit light which is directed toward the film carrier 38 (i.e., the photographic film 22) and whose longitudinal direction coincides with the widthwise direction of the photographic film 22. At the same time, the slit light is made emergent as diffused light by the light diffusion plate. As the light emergent from the diffusion box 40 is made into diffused light, the unevenness in the quantity of light applied to the photographic film 22 is reduced, and the slit light of a uniform quantity of light is applied to the film images. At the same time, even if the film images have been scored, the scores become less noticeable.

The film carrier 38 and the diffusion box 40 are prepared for each type of the photographic film 22 and are selected in accordance with the photographic film 22.

At positions on the upper surface and the lower surface of the film carrier 38 corresponding to the optical axis L, elongated openings (not shown) which are longer than the width of the photographic film 22 are respectively provided in such a manner as to extend in the widthwise direction of the photographic film 22. The slit light from the diffusion box 40 is applied to the photographic film 22 through the opening provided in the lower surface of the film carrier 38, and the light transmitted through the photographic film 22 reaches the reading section 43 through the opening provided in the upper surface of the film carrier 38.

The film carrier 38 is provided with an unillustrated guide for guiding the photographic film 22 so that the slit light from the diffusion box 40 is curved at the position where the slit light from the diffusion box 40 is applied (at the reading position). As a result, the planarity of the photographic film 22 at the reading position can be secured.

In addition, the diffusion box 40 is supported in such a manner that its upper surface is in close proximity to the reading position. Accordingly, a notched portion is provided in the lower surface of the film carrier 38 so that the film carrier 38 and the diffusion box 40 do not interfere with each other at the time of the loading of the film carrier 38.

Incidentally, the film carrier 38 is arranged to be capable of transporting the photographic film 22 at a plurality of speeds corresponding to the densities of the film images which are time scanned for example, and so on, during prescanning and fine scanning.

The reading section 43 is arranged in a state of being accommodated in a casing 44. Disposed inside the casing 44 is a mounting base 47 on the upper side of which a line CCD 116 serving as a reading means is mounted. A plurality of supporting rails 49 are suspended from the mounting base 47. A lens unit 50 is supported by the supporting rails 49 in such a manner as to be slidingly movable in the direction A in which the lens unit 50 approaches and moves away from the worktable 27 to vary the power of its magnification for such as reduction and enlargement. A supporting frame 45 is provided uprightly on the worktable 27. The mounting base 47 is supported by a guide rail 42, which is attached to the supporting frame 45, in such a manner as to be slidingly movable in the direction B in which the mounting base 47 approaches and moves away from the worktable 27 to secure conjugate length at the time of varying the magnification or autofocusing. The lens unit 50 is comprised of a plurality of lenses, and a lens diaphragm 51 is provided in the plurality of lenses. As shown in FIG. 4C, the lens diaphragm 51 has a plurality of diaphragm plates 51A which are each formed substantially in a C-shape. The diaphragm plates 51A are arranged at equal pitches around the optical axis L, and each diaphragm plate 51A has one end portion pivotally supported by a pin and is rotatable about the pin. The plurality of diaphragm plates 51A are connected by unillustrated links, and rotate in the same direction when the driving force of a lens-diaphragm driving motor (which will be described later) is transmitted thereto. In conjunction with the rotation of the diaphragm plates 51A, the area of a portion which is not shielded by the diaphragm plates 51A (a substantially star-shaped portion in FIG. 4C) changes, so that the quantity of light passing through the lens diaphragm 51 changes.

The line CCD 116 is arranged such that a multiplicity of photoelectric conversion elements such as CCD cells or photodiodes are arrayed in a row in the widthwise direction of the photographic film 22, and sensing portions each provided with an electronic shutter mechanism are provided in three lines at intervals and in parallel to each other, one of R, G, and B color separation filters being attached to the light-incident side of the respective sensing portion (the so-called three-line color CCD). In addition, a transfer portion comprising a multiplicity of CCD cells is provided in the vicinity of each sensing portion in correspondence with the respective sensing portion, and electric charges stored in the CCD cells of each sensing portion are consecutively transferred via the corresponding transfer portion.

In addition, a CCD shutter 52 is provided on the light-incident side of the line CCD 116. As shown in FIG. 4D, an ND filter 52ND is fitted in the CCD shutter 52. The CCD shutter 52 rotates in the direction of arrow u, and is changed over to one of a fully closed state (a portion 52B or the like where the ND filter 52ND is not fitted is located at a position 52C including the optical axis L) for shielding the light incident upon the line CCD 116 for the purpose of dark correction, a fully open state (the position shown in FIG. 4D) for making the light incident upon the line CCD 116 for the purpose of ordinary reading or light correction, and an attenuating state (the ND filter 52ND is located at the position 52C) for attenuating the light incident upon the line CCD 116 by using the ND filter 52ND for the purpose of linearity correction.

As shown in FIG. 3, a compressor 94 for generating cooling air for cooling the photographic film 22 is disposed inside the worktable 27. The cooling air generated by the compressor 94 is guided by a guide tube 95 and is supplied to an unillustrated reading portion of the film carrier 38. Consequently, it is possible to cool the region of the photographic film 22 located in the reading portion. It should be noted that the guide tube 95 is passed through a flow sensor 96 serving as a detecting means for detecting the flow rate of cooling air. Incidentally, the present invention is not limited to the flow sensor, and it is possible to provide a sensor for detecting the velocity of the cooling air or a pressure sensor for detecting the pressure of the cooling air.

Figure 5:
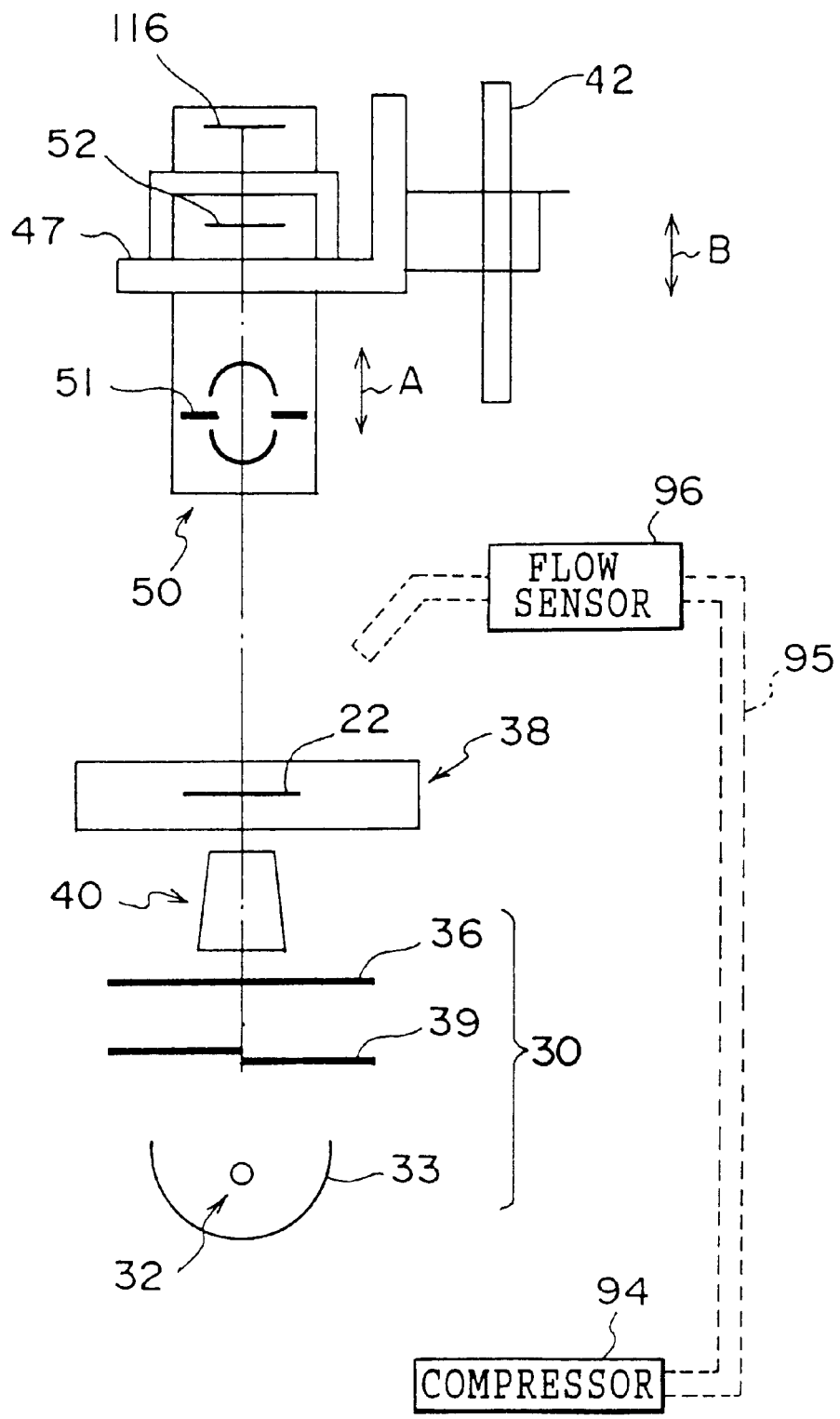
FIG. 5 is a diagram illustrating only essential portions of the optical system of the line CCD scanner.
Figure 6:
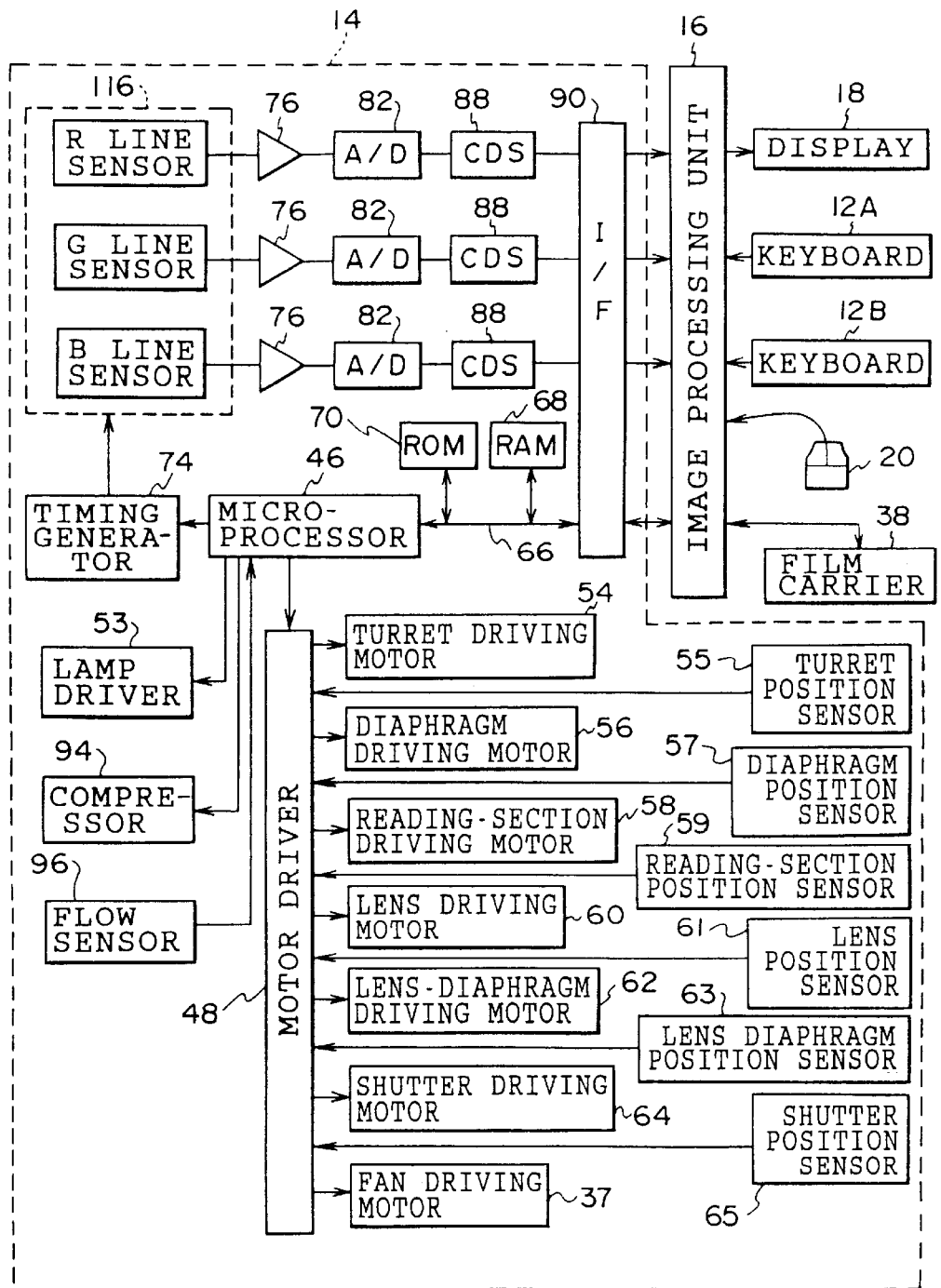
FIG. 6 is a block diagram illustrating a schematic configuration of an electrical system of the line CCD scanner.

Referring to FIG. 6, a description will be given of a schematic configuration of electrical systems of the line CCD scanner 14 and the image processing unit 16 with reference to essential portions of the optical system of the line CCD scanner 14 shown in FIG. 5.

The line CCD scanner 14 has a microprocessor 46 for controlling the overall line CCD scanner 14 and serving as a reducing means. A RAM 68 (e.g., an SRAM) and a ROM 70 (e.g., a ROM capable of rewriting its stored contents) are connected to the microprocessor 46 via a bus 66, and a lamp driver 53, the compressor 94, the flow sensor 96, and a motor driver 48 are also connected thereto. The lamp driver 53 turns on and off the lamp 32 in accordance with the instruction from the microprocessor 46. In addition, at the time of reading the images on the photographic film 22, the microprocessor 46 operates the compressor 94 to supply cooling air to the photographic film 22. The flow rate of the cooling air is detected by the flow sensor 96, and the microprocessor 46 detects an abnormality.

Figure 4B:
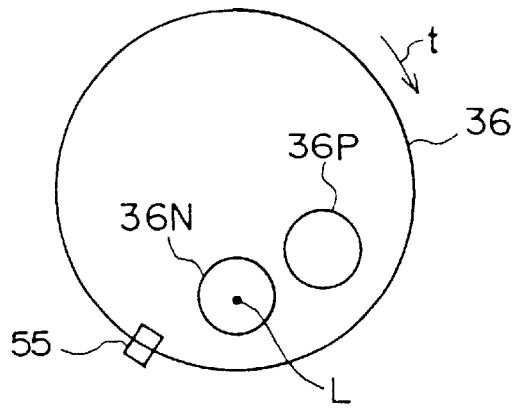
FIG. 4B is a plan view illustrating one example of a turret.
Figure 4C:
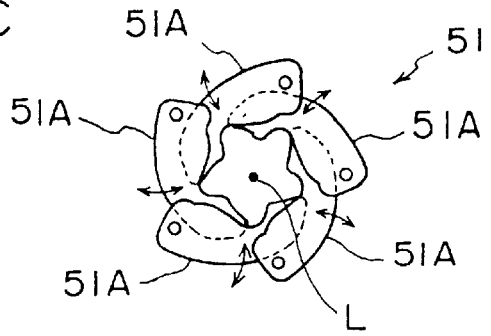
FIG. 4C is a plan view illustrating one example of a lens diaphragm.
Figure 4D:
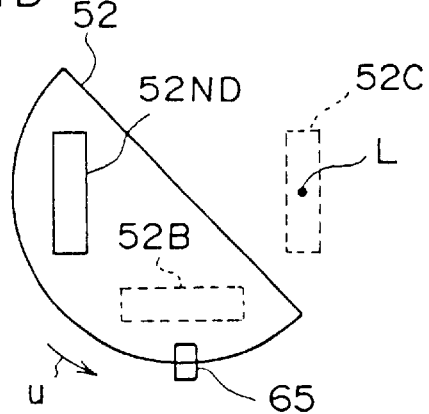
FIG. 4D is a plan view illustrating one example of a CCD shutter.

In addition, connected to the motor driver 48 are a turret driving motor 54 for rotatively driving the turret 36 in the direction of arrow t in FIG. 4B so that either the balance filter 36N for negative film or the balance filter 36P for reversal film of the turret 36 is located at the optical axis L, as well as a turret position sensor 55 (see FIG. 4B as well) for detecting a reference position (an unillustrated notch) in the turret 36. The following are further connected to the motor driver 48: a diaphragm driving motor 56 for slidingly moving the diaphragm 39; a diaphragm position sensor 57 for detecting the position of the diaphragm 39; a reading-section driving motor 58 for slidingly moving the mounting base 47 (i.e., the line CCD 116 and the lens unit 50) along the guide rail 42; a reading-section position sensor 59 for detecting the position of the mounting base 47; a lens driving motor 60 for slidingly moving the lens unit 50 along the supporting rails 49; a lens position sensor 61 for detecting the position of the lens unit 50; a lens-diaphragm driving motor 62 for rotating the diaphragm plates 51A of the lens diaphragm 51; a lens diaphragm position sensor 63 for detecting the position of the lens diaphragm 51 (the position of the diaphragm plate SA); a shutter driving motor 64 for changing over the state of the CCD shutter 52 to one of the fully closed state, the fully open state, and the attenuating state; a shutter position sensor 65 for detecting the shutter position; and a fan driving motor 37 for driving the fan 34.

At the time of prescanning (preliminary reading) and fine scanning (full reading) by the line CCD 116, the microprocessor 46 causes the turret 36 to be rotatively driven by the turret driving motor 54 on the basis of the position of the turret 36 detected by the turret position sensor 55, and concurrently causes the diaphragm 39 to be slidingly moved by the diaphragm driving motor 56 on the basis of the position of the diaphragm 39 detected by the diaphragm position sensor 57, thereby adjusting the quantity of light applied to the film images.

In addition, the microprocessor 46 determines the zoom magnification in correspondence with the size of the film images and whether or not trimming is to be effected. Further, the microprocessor 46 causes the mounting base 47 to be slidingly moved by the reading-section driving motor 58 on the basis of the position of the mounting base 47 detected by the reading-section position sensor 59, and causes the lens unit 50 to be slidingly moved by the lens driving motor 60 on the basis of the position of the lens unit 50 detected by the lens position sensor 61, so that the film images will be read by the line CCD 116 at the determined zoom magnification.

In a case where autofocus control is effected in which the light-receiving surface of the line CCD 116 is made to coincide with the position where film images are formed by the lens unit 50, the microprocessor 46 causes only the mounting base 47 to be slidingly moved by the reading-section driving motor 58. This autofocus control in one example can be effected such that the contrast of the film images which are read by the line CCD 116 becomes maximum (the so-called image contrast method). Alternatively, a distance sensor may be provided for measuring the distance between the photographic film 22 and the lens unit 50 (or the line CCD 116) by infrared rays or the like, and autofocus control may be effected on the basis of the distance detected by the distance sensor instead of the data on the film images.

Meanwhile, a timing generator 74 is connected to the line CCD 116. The timing generator 74 generates various timing signals (clock signals) for operating the line CCD 116, an A/D converter 82 which will be described later, and the like. The signal output terminal of the line CCD 116 is connected to the A/D converter 82 via an amplifier 76, and the signal outputted from the line CCD 116 is amplified by the amplifier 76, and is converted to digital data by the A/D converter 82.

The output terminal of the A/D converter 82 is connected to the image processing unit 16 via a correlated double sampling circuit (CDS) 88 and an interface (I/F) circuit 90. In the CDS 88, feedthrough data representing the level of a feedthrough signal and pixel data representing the level of a pixel signal are respectively sampled, and feedthrough data is subtracted from the pixel data for each pixel. Then the results of calculation (pixel data accurately corresponding to the amount of charge stored in the respective CCD cells) are consecutively outputted to the image processing unit 16 as scan image data through the I/F circuit 90.

Since R, G, and B read signals are outputted in parallel from the line CCD 116, three signal processing systems each comprised of the amplifier 76, the A/D converter 82, and the CDS 88 are provided. The R, G, and B image data are inputted in parallel to the image processing unit 16 from the I/F circuit 90 as the scanned image data.

Further, the aforementioned display 18, keyboards 12A, 12B, mouse 20, and film carrier 38 are connected to the image processing unit 16.

Figure 7:
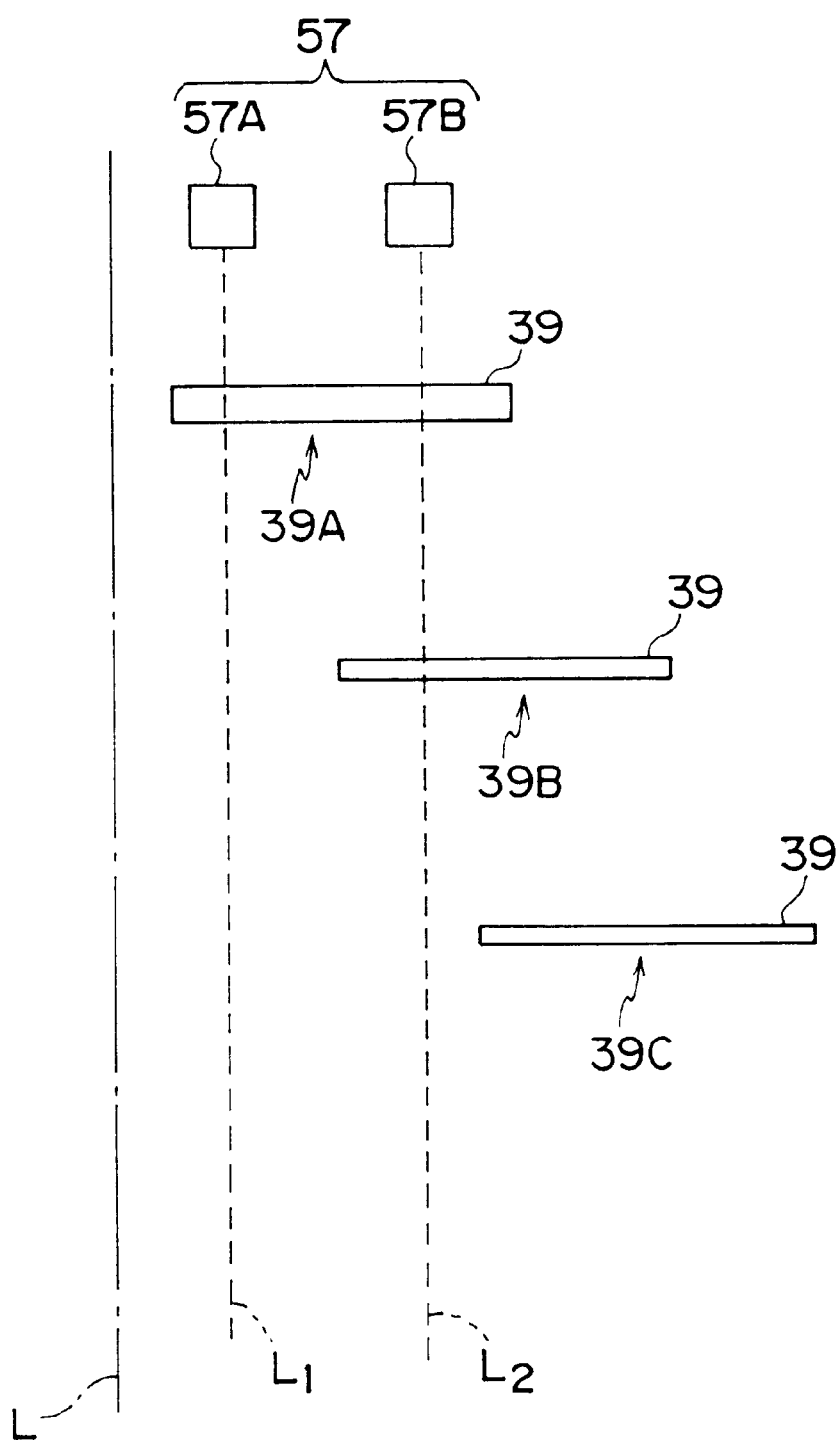
FIG. 7 is a diagram illustrating the arrangement of a diaphragm position sensor and the position of diaphragm plates.

As shown in FIG. 7, the diaphragm position sensor 57 is comprised of a first photosensor formed by an origin detecting sensor (light-receiving element) 57A disposed in the vicinity of the optical axis L and a light-emitting element (not shown) disposed in correspondence with the origin detecting sensor 57A, as well as a second photosensor formed by a standby sensor (light-receiving element) 57B disposed farther from the optical axis L and a light-emitting element (not shown) disposed in correspondence with the standby sensor 57B.

Here, as shown in FIG. 7, the position 39A where the diaphragm 39 is located at the positions of both optical axes L1 and L2 of the first and second photosensors (the origin detecting sensor 57A and the standby sensor 57B are not receiving the light) will be referred to as the position of the origin; the position 39B where the diaphragm 39 is located at only the position of the optical axis L2 of the second photosensor (only the origin detecting sensor 57A is receiving the light) will be referred to as the standby position; and the position 39C where the diaphragm 39 is not located at the positions of the optical axes L1 and L2 of the first and second photosensors (the origin detecting sensor 57A and the standby sensor 57B are receiving the light) will be referred to as a critical position.

In the case where the diaphragm 39 is located at the position of the origin, the amount of light applied to the photographic film 22 is small, so that there is no risk of degeneration of the photographic film 22. In the case where the diaphragm 39 is located at the critical position, the amount of light applied to the photographic film 22 is large, so that there is the risk of degeneration. In the case where the diaphragm 39 is located at the standby position, that position is close to the prescanning position.

In this embodiment, if the diaphragm 39 is located at the position of the origin, since the amount of light applied to the photographic film 22 is small and there is no risk of degeneration, the operation of the compressor 94 is stopped. Consequently, it is possible to prolong the life of the compressor 94. On the other hand, in this embodiment, if the diaphragm 39 is located at the critical position, the compressor 94 is operated since the amount of light applied to the photographic film 22 is large and there is the risk of degeneration.

In addition, in this embodiment, the diaphragm 39 is moved to the standby position (39B) (FIG. 7) upon completion of scanning (prescanning and fine scanning), and is moved to the position of the origin 39A (FIG. 7) unless a scan start is instructed within a predetermined time (e.g., one minute). Incidentally, if a scan start is instructed within the predetermined time, i.e., if a film-leading-end detection signal is inputted from the film carrier 38, or if a scan start is keyed in from the keyboard 12A or 12B, the diaphragm 39 is moved to a predetermined prescanning position.

The reason why the diaphragm 39 is moved to the standby position upon completion of scanning is to allow the diaphragm 39 to be moved immediately to the prescanning position upon receiving an instruction of the scanning start since the standby position is a position close to the prescanning position as described before.

The reason why the diaphragm position sensor 57 is formed by the two sensors including the first and second photosensors is in view of the fact that although only either one of the sensors may be provided, an encoder must be provided on the diaphragm driving motor 56, and it is necessary to constantly monitor at which position the diaphragm 39 is located by such as counting the pulse signal from the encoder, so that the construction and control become complex.

Next, a description will be given of the operation of the line CCD scanner 14 in accordance with this embodiment.

When the photographic film 22 is inserted into the film carrier 38, an unillustrated photographic-film identifying sensor of the film carrier 38 detects the photographic film 22, and the film carrier 38 automatically starts transporting the photographic film 22.

At the same time, the respective sections of the line CCD scanner 14 are moved to a preparatory state for effecting preliminary reading (hereafter referred to as prescanning) to determine optimum exposure conditions, and the line CCD scanner 14 effects prescanning while transporting the photographic film 22 at a predetermined fixed speed to coarsely read the images recorded on the photographic film 22.

Here, the aforementioned preparatory state refers to a state for, among others, setting the magnification of projection (optical magnification) onto the line CCD 116 by the lens unit 50, setting the quantity of light applied from the lamp 32, and for setting the period of reading (including the storage time and transfer time) by the line CCD 116.

In addition, in prescanning, images are read under the same apparatus conditions (the aforementioned optical magnification, the quantity of light applied, the reading period, etc.) at one time in a processing unit of the photographic film 22, e.g., a one-strip portion in the case where the photographic film 22 is an elongated photographic film in a strip form.

Upon completion of prescanning, the-called setup calculation is performed in which exposure conditions for obtaining optimum image quality are determined on the basis of the images which have been read during prescanning. In addition, if necessary, the images which have been read during prescanning are processed according to the conditions corrected by the setup, and positive images illustrating the finished state are displayed on the display 18. The operator checks the positive images on the monitor, further manually corrects the densities, colors, and the like of the images as required, performs trimming operations as required, and designate the ranges of images to be read. Further, when images are outputted on photographic printing paper, the operator also designates the output image size (so-called print size), the number of sheets to be outputted, and the like. After all the conditions are thus prepared, the operator gives an instruction to effect final reading (hereafter referred to as fine scanning) through key entry or the like.

Consequently, while the photographic film 22, which was once transported up to its leading end with respect to the reading position during prescanning, is now being transported in an opposite direction to that of prescanning, the apparatus proceeds to an apparatus state necessary for fine-scanning the images recorded on the photographic film 22.

Here, the aforementioned apparatus state necessary for fine scanning refers to a state for setting the transporting speed for transporting the photographic film 22, setting the aforementioned optical magnification, setting the aforementioned quantity of light applied, and setting the aforementioned reading period and the like. As a result, optimum exposure conditions are set for each frame of the image to be read.

Then, after completion of the proceeding to the aforementioned apparatus state, the line CCD scanner 14 effects the fine scanning of the images recorded on the photographic film 22 under the designated exposure conditions for each frame while transporting the photographic film 22 in the opposite direction to that of prescanning by controlling the film carrier 38.

The image signals obtained by being read by the line CCD 116 by fine scanning are amplified by the amplifiers 76, and are converted into digital data (image data) by the A/D converters 82.

As for the aforementioned image data, an offset of the line in the scanning direction (so-called color offset) which has been read by the three line sensors of the line CCD 116 is corrected by the CDS 88, and the corrected image data is inputted to the image processing unit 16 through the interface (I/F) circuit 90. Incidentally, the image data is converted to a predetermined number of pixels by an unillustrated enlarging/reducing circuit in the image processing unit 16 to obtain final image data. This image data is transferred to an image recording apparatus separate from the apparatus of the present invention, and the image is scanned and exposed on photographic printing paper and is subjected to development processing, thereby obtaining a desired photographic print.

During the operation described above, when the photographic film 22 is inserted into the film carrier 38 and when the photographic film 22 is transported by the film carrier 38, the photographic film 22 is cooled simultaneously with a prescanning start and while the photographic film 22 is being transported. Namely, the compressor 94 is operated. On the other hand, upon completion of fine scanning and detection of an exit of the photographic film 22 from the reading region, the cooling of the photographic film 22 is stopped. Namely, the operation of the compressor 94 is stopped.

Here, the cooling of the photographic film 22 may be effected such that the cooling operation initially proceeds gradually from a weak cooling state to a strong cooling state, and the stopping of cooling may be effected such that the cooling operation proceeds gradually from the strong cooling state to the weak cooling state. That is, an arrangement may be provided such that the weak cooling state is continued without completely stopping cooling in order to make it possible to immediately cope with the insertion of an ensuing photographic film 22.

In cooling, the cooling state is controlled by controlling the voltage in a case where a cooling means is used whose cooling capacity is variable by changing the voltage, and by controlling an inverter means in a case where a cooling means is used whose cooling capacity is variable by an inverter system. In addition, the cooling state may be controlled by opening or closing the configuration of the opening of a nozzle portion which is an air outlet.

Figure 8A:
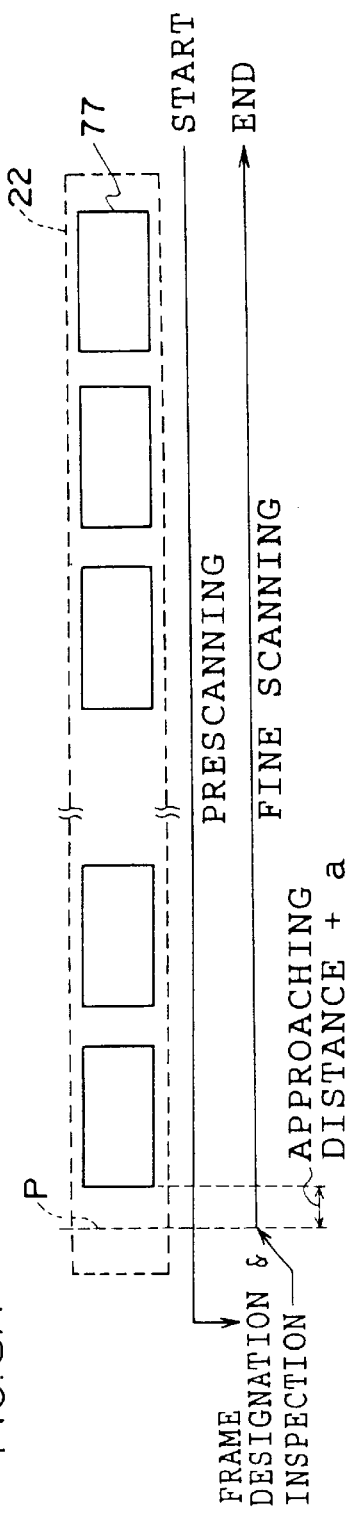
FIGS. 8A and 8B are conceptual diagrams illustrating the operation of prescanning and fine scanning.
Figure 8B:
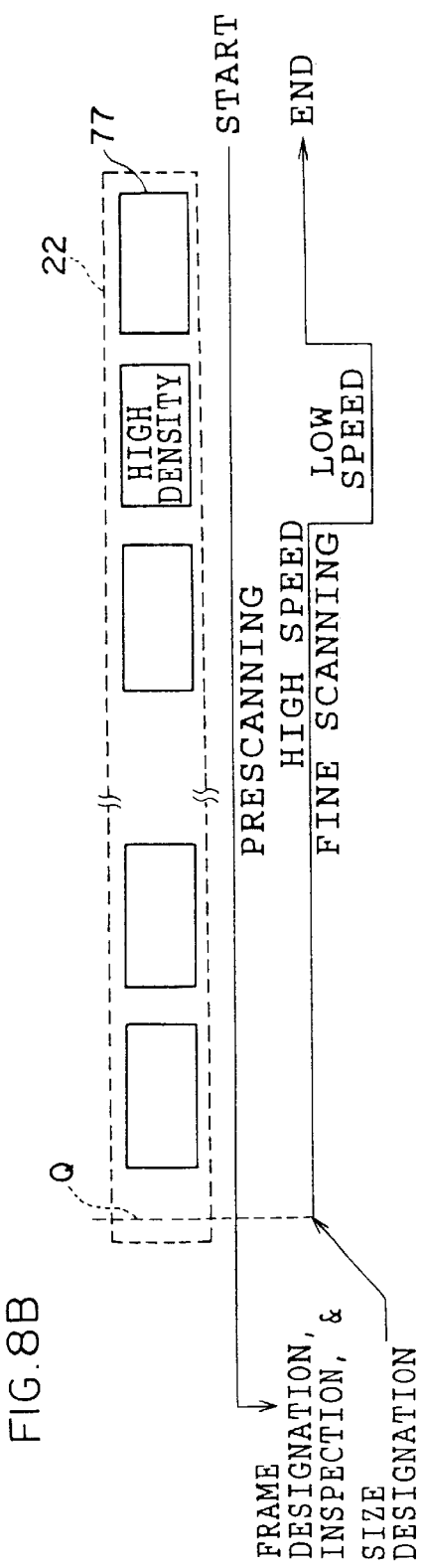

Referring to FIGS. 8A and 8B, a further description will be given of the above-described operation. FIG. 8A shows the basic operation of reading which corresponds to so-called simultaneous print images in which print images are consecutively formed by reading a series of frame images 77 of a 35-mm size photographic film 22 (strip). FIG. 8B shows the operation of reading (mainly the transporting speed) in a case where a particular frame image (high-density frame) is mixed in the photographic film 22. Namely, the transporting speed at the time when a particular frame image is read becomes slower than the transporting speed (high speed) at the time when the images other than the particular frame image are read. Incidentally, information as to such as whether or not an image has a high density is obtained from prescanning.

It should be noted that, in actuality, the photographic film 22 is transported such that various portions of the photographic film 22 pass the reading position. In FIGS. 8A and 8B, however, the reading position is shown as moving relative to the photographic film 22 for the sake of explanation.

When a series of images are read in the above-described manner, an illuminated region stays for a predetermined time at a predetermined photographic film position P to reverse the transporting direction between prescanning and fine scanning. In addition, the illuminated region stays for a predetermined time at a predetermined position Q to make the transporting speed at the time of reading a particular frame image slower than the transporting speed at the time of reading the images other than the particular frame image, i.e., to change over the transporting speed.

In this embodiment, in view of the above-described facts, in the case where the illuminated region stays for a predetermined time at the predetermined position, the diaphragm 39 is stopped down by a predetermined amount (is moved to the aforementioned standby position 39B (FIG. 7) so as to reduce the amount of light applied to the photographic film 22, thereby preventing the photographic film 22 from becoming overheated.

FIG. 9 shows the results of a test in which the relationship between the film illuminating time for illuminating the photographic film 22 and the temperature of the photographic film was examined under the conditions of a 400 W halogen lamp (lamp 32), the cooling air velocity of 0–10 [m/s] at the reading position, and the room temperature as the cooling air temperature.

The temperature of the photographic film 22 was taken as the ordinate, and the lines at 80° C., 107° C., and 113° C. which are parallel to the axis of abscissas respectively show a target value of the finally reached temperature of the illuminated region, the glass transition temperature of the TAC base material of a 35-mm size photographic film, and the glass transition temperature of the PET base material of an APS size photographic film. The axis of abscissas shows the illuminating time whose value changes depending on the length of the illuminated region in the transporting direction and the transporting speed.

The following points can be understood from the relationship between the illuminating time for illuminating the photographic film 22 and the temperature of the photographic film, which is shown in FIG. 9.

First, in a state in which cooling air is absent (V=0 [m/s], only a short illuminating time of 2.5 [s] or less is allowed to maintain the temperature of the photographic film at 80° C. or less.

Second, in a case where the velocity of cooling air is V=4 [m/s], an illuminating time of 5 [s] or thereabouts is allowed to maintain the temperature of the photographic film at 80° C. or less. Further, in a case where the velocity of cooling air is V=6 [m/s] or more, even if the photographic film is stopped, it is possible to maintain the temperature of the photographic film at 80° C. or less.

Third, in a case where the velocity of cooling air is low (V=less than 4 [m/s]), if the photographic film 22 is halted (stays as described above) for a long time in the illuminated region, still another temperature-rise controlling measure is required to maintain the temperature at 80° C. or less.

Here, the heat-resistant temperature at which the photographic film 22 is not degenerated can be set to a temperature which is lower by a predetermined value than the glass transition temperature Tg of the base surface side of the photographic film 22. The reason for using the glass transition temperature Tg of the base surface side is that the degeneration temperature of the emulsion surface side of the photographic film 22 is higher than the glass transition temperature Tg of the base surface side. When the temperature of the photographic film 22 has become greater than or equal to the glass transition temperature Tg of the base surface side, the material on the base surface side assumes a fluid state, so that deformation (degeneration) occurs. On the other hand, the reason for setting the heat-resistant temperature to a temperature lower by a predetermined value than the glass transition temperature Tg is in view of the fact that it was confirmed by the present inventors' experiment and the like that if heat is imparted in a state in which the photographic film 22 is curled with the base surface side placed on the inner side, the so-called creep phenomenon occurs in which deformation gradually advances even if the temperature is less than the aforementioned glass transition temperature Tg, and that the longer the period of heating, the more the amount of deformation increases. Accordingly, if the allowable temperature of the photographic film 22 is taken into account, this creep phenomenon is also taken into consideration to ensure that the relevant temperature does exceed a temperature which is lower than the glass transition temperature Tg.

Accordingly, the photographic film 22 may be cooled so that the temperature of the photographic film 22 does not exceed the temperature which is lower than the glass transition temperature Tg.

Here, the velocity of cooling air in the reading region of the photographic film 22 is 0.5 [m/s] to 10 [m/s], preferably 2 [m/s] to 8 [m/s]. Namely, the air velocity for setting the temperature T of the photographic film 22 at a threshold value Tth is selected from the test results shown in FIG. 9 and the time during which various portions of the photographic film 22 pass through the reading region (illuminating time), which is obtained from the transporting speed of the photographic film 22 and the length of the reading region in the transporting direction. It should be noted that if the velocity of cooling air exceeds 10 [m/s], it is not necessarily effective in terms of the cooling efficiency, and numerous adverse effects occur such as the vibration due to air for cooling the photographic film, howling sound at the cooling air outlet, noise from the cooling means such as the compressor, and increased power consumption.

Since the cooling air generated by the compressor (which is greater in the flow rate, the current velocity, and the air pressure than cooling air generated by a fan) is guided to the illuminated region of the photographic film which is transported, even if the quantity of light applied to the photographic film is increased, it is possible to prevent the photographic film from becoming degenerated. Namely, this embodiment differs substantially from the above-described conventional art in which images recorded on a photographic film are read when the photographic film is stationary in that the photographic film is transported to the region where a large quantity of slit light is applied, and that cooling air is blown onto the region of the photographic film illuminated by the slit light (which region assumes a temperature higher than that of a nonilluminated region).

Even if cooling air generated by the compressor is blown onto the photographic film to prevent the degeneration of the photographic film, it is impossible to prevent the degeneration of the photographic film if the compressor suffers a breakdown or the film carrier is faulty. Therefore, in this embodiment, the following abnormality processing is executed.

Figure 10:
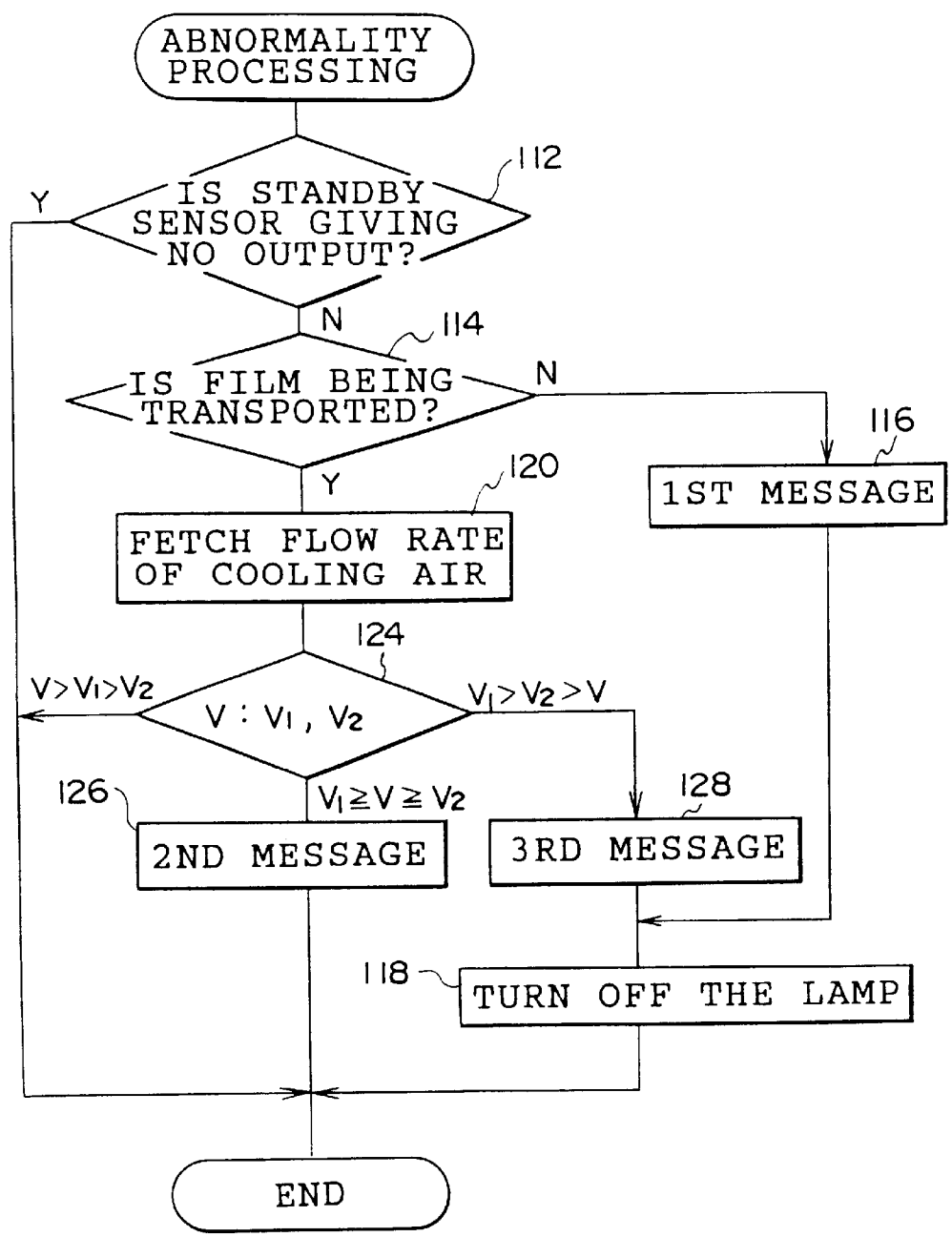
FIG. 10 is a flowchart illustrating an abnormality processing routine.

Namely, FIG. 10 shows an abnormality processing routine which is repeatedly executed at each predetermined timing after the main power is turned on. In Step 112, a determination is made as to whether the standby sensor 57B is giving no output. If the standby sensor 57B is giving no output, it means that the diaphragm 39 is not located at the critical position, i.e., is located at the position of the origin or the standby position. Hence, even if the application of the light to the photographic film 22 is continued, there is no risk of degeneration since the quantity of light is small. Therefore, this routine ends.

If the standby sensor 57B is giving an output, it means that the diaphragm 39 is located at the critical position. Hence, if some abnormal situation occurs, the photographic film 22 will degenerate, so that the following processing is executed.

Namely, in Step 114, on the basis of a signal from the film carrier 38 a determination is made as to whether or not the photographic film 22 is being transported. Incidentally, whether or not the film carrier 22 is being transported is determined on the basis of whether or not the photographic film 22 is stopped and whether or not the photographic film 22 is being transported at a necessary speed.

Here, if an unillustrated transport motor within the film carrier 38 is being operated, a motor drive signal is inputted from the film carrier 38, whereas if the transport motor is not being operated (at the time of such as light/dark correction, optical axis adjustment, and preparation of an illuminant diaphragm table), a predetermined adjustment signal is inputted therefrom. It should be noted that the motor drive signal and the predetermined adjustment signal are inputted to different ports of the microprocessor 46. In this Step 114, by determining whether the motor drive signal and the predetermined adjustment signal have not been inputted for a predetermined time duration, a determination made be made on the abnormality of the state of transport of the photographic film 22. Still alternatively, the perforations provided in the photographic film 22 may be detected in the film carrier 38, and the relevant determination may be made by determining whether the perforations have not been detected at timings at which the perforations should be detected, or by determining the out-of-step state of the motor or the current flowing across the motor. Further, a situation is also conceivable in which although the unillustrated transport motor is operating, the photographic film 22 in the film carrier 38 is caught and is not being transported smoothly by undergoing slippage or the like, thereby causing the photographic film 22 to stay at the illuminating position. This is the state of a so-called photographic film jamming. In this case, an arrangement may be provided such that after providing an encoder on a driven roller (not shown) abutting against the photographic film 22, the interval between encoder outputs is monitored during the operation of the transport motor, and if the output is not detected for a predetermined time duration, a determination may be made that the state of transport of the photographic film 22 is abnormal.

If it is determined in Step 114 that the photographic film 22 is not being transported, in Step 116, a first message to the effect that the state of transport of the photographic film 22 is abnormal is displayed on the display 18, and the lamp 32 is turned off in Step 118.

On the other hand, if the photographic film 22 is being transported, the flow rate of cooling air (the flow rate per predetermined time (corresponding to air velocity)) V is fetched from the flow sensor 96 in Step 120. It should be noted that there are cases where the flow rate declines due to the deterioration of the compressor, the loading of a filter of the compressor, and the like.

In Step 124, a comparison is made between, on the one hand, the fetched flow rate V and, on the other hand, a flow-rate cautionary velocity V1 at which the flow rate has begun to deteriorate a nd a flow-rate critical velocity V2 at which the photographic film 22 may possibly degenerate.

If the fetched flow rate V is greater than the flow-rate cautionary velocity V1 and the flow-rate critical velocity V2 (V>V1>V2), cooling air is being supplied with an appropriate flow rate, so that this routine ends.

If the fetched flow rate V is between the flow-rate cautionary velocity V1 and the flow-rate critical velocity V2 (V1≧V>V2), the flow rate has deteriorated, but there is no possibility of degeneration of the photographic film 22. Hence, in Step 126, to arouse the operator's attention, a second message to the effect that "The cooling air for the film has declined. The loading of the compressor filter and the like are conceivable." is displayed on the display 18, and this routine ends.

If the fetched flow rate V is smaller than the flow-rate cautionary velocity V1 and the flow-rate critical velocity V2 (V1>V2>V), the flow rate is insufficient, and there is the possibility of degeneration of the photographic film 22. Hence, in Step 128, a third message to the effect that "The cooling air for the film has declined. The lamp has been turned off." or the like is displayed on the display 18. The operation then proceeds to Step 118 to turn off the lamp 32.

As described above, in a case where an abnormal state leading to the degeneration of the photographic film illuminated by the light has been detected, the lamp is turned off, so that it is possible to prevent the deterioration of the photographic film.

It should be noted that if at least one of a plurality of kinds of abnormal states, such as the state of transport of the photographic film and the state of the flow rate of the cooling air, has been detected, the lamp is turned off; therefore, the quantity of light applied to the photographic film can be reduced in conformity with the plurality of kinds of abnormal states, so that the degeneration of the photographic film can be prevented more effectively.

Although, in the above-described embodiment, the state of transport of the photographic film and the state of the flow rate of the cooling air are detected as the abnormal states, the present invention is not limited to the same. Instead of the state of transport and the state of the flow rate, or in conjunction with the state of transport and the state of the flow rate, at least one of the state of the temperature of cooling air, the state of the temperature of the photographic film, the illuminating state of the light source section, the state of closure of the casing of the light source section, and the operational state of the microprocessor (computer) which is the reducing means may be detected.

Figure 11:
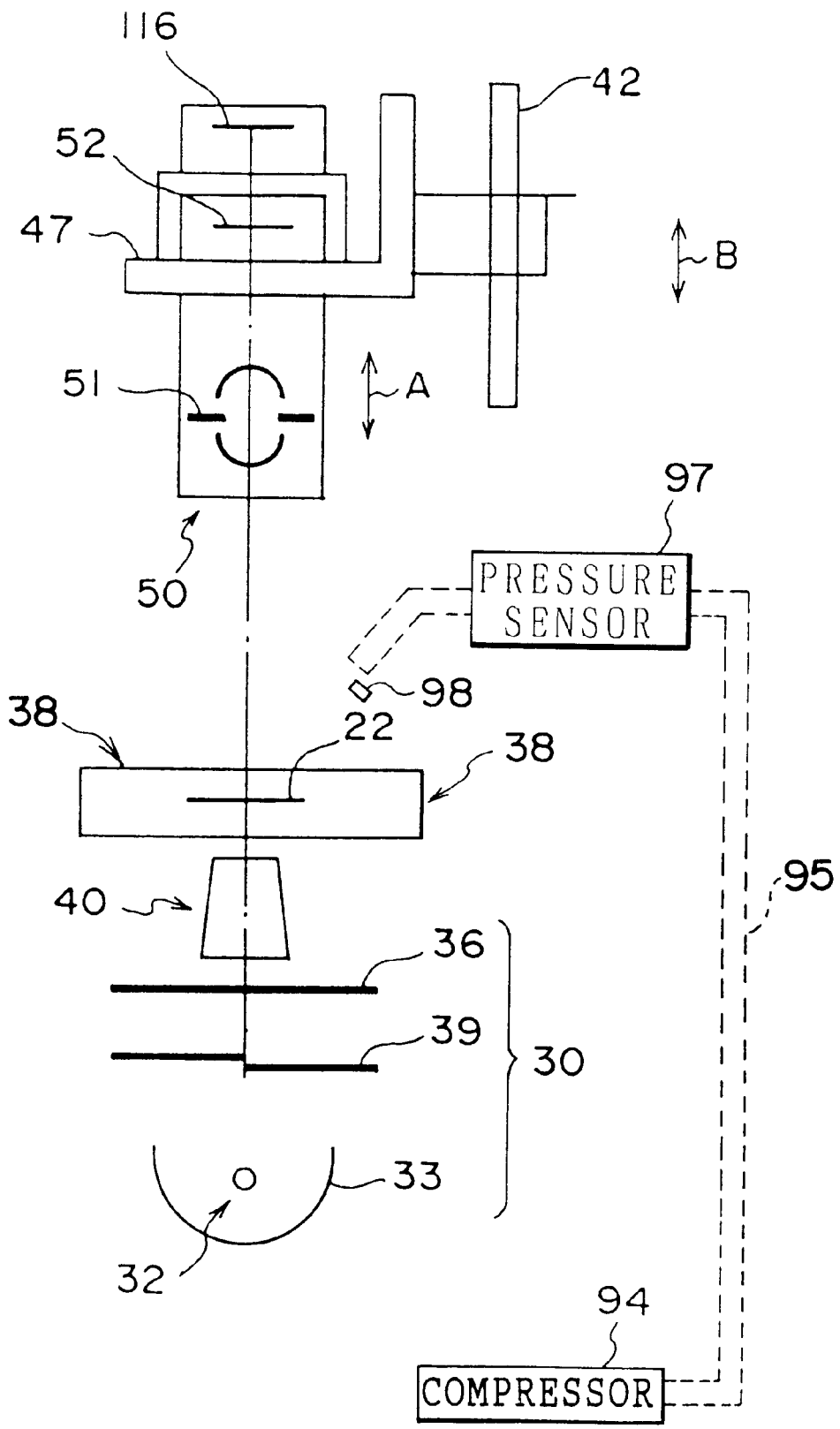
FIG. 11 is a diagram illustrating only the essential portions of the optical system of the line CCD scanner in a case where a temperature sensor for detecting the temperature of cooling air and a pressure sensor for detecting the pressure of cooling air are used.

The state of the temperature of cooling air can be detected by providing, for instance, a temperature sensor 98 in the vicinity of an outlet of cooling air, as shown in FIG. 11. In an alternative example, the temperature sensor 98 may be provided in the vicinity of any position on the guide tube 95 leading from the compressor 94 to the cooling air outlet or inside the guide tube 95.

The state of the temperature of the photographic film can be detected by a temperature sensor for detecting the temperature of the illuminated region of the photographic film 22. In this case, the temperature of the vicinity of the illuminated region of the photographic film 22 may be detected to detect the temperature of the vicinity of the region of the photographic film which is heated most. Then, a temperature which is lower than the glass transition temperature Tg is set as the threshold value Tth by taking the aforementioned creep phenomenon into consideration, and a determination is made as to whether or not the temperature of the photographic film 22 detected by the temperature sensor is greater than or equal to the threshold value Tth, to thereby determine an abnormal state. Incidentally, the reason why the threshold value Tth is determined by taking into consideration the heat-resistant temperature $T_0$ of not the emulsion surface of the photographic film but the base surface of the photographic film is to prevent the situation in which since the heat-resistant temperature $T_0$ of the base surface of the photographic film is lower than the heat-resistant temperature of the emulsion surface, even if the temperature of the vicinity of the photographic film is lower than the heat-resistant temperature of the emulsion surface, the temperature of the vicinity of the photographic film may become greater than the heat-resistant temperature of the base surface, resulting in deterioration. It should be noted that a temperature fuse may be provided in the vicinity of the illuminated region of the photographic film, and whether or not the temperature fuse is disconnected may be electrically detected, thereby determining an abnormal state.

As for the illuminating state of the light source section 30, an abnormal state is determined by providing a sensor for detecting the amount of illumination of light or by detecting the value of current supplied to the lamp 32.

In addition, the illuminating state of the light source section 30 includes the cumulative period of light (cumulative illumination time) which is applied to the same location on the photographic film. In this case, if the cumulative illumination time has exceeded a predetermined value, a determination is made that the state is abnormal.

The state of closure of the casing 31 of the light source section 30 is determined is determined by an interlock or by disconnection of a control wire or the like.

The operational state of the microprocessor (computer) is determined by providing a so-called watchdog circuit for determining the runaway state of the computer by monitoring a pulse signal from the computer.

In addition, although, in the above-described embodiment, a description has been given of the case where the flow sensor 96 is provided on the guide tube 95 as a means for detecting the flow rate of cooling air, the present invention is not limited to the same. For example, it is possible to adopt an arrangement in which, as shown in FIG. 11, a pressure sensor 97 is provided instead of the aforementioned flow sensor 96, and the pressure of cooling air is detected by the pressure sensor 97 and is converted to the flow rate.

In addition, although, in the above-described embodiment, when an abnormal state is detected, the lamp 32 is turned off, the present invention is not limited to the same, and the diaphragm 39 may be moved to the position of the origin, or a separately provided shutter may be inserted. Further, by controlling the film carrier 38, the photographic film 22 may be automatically ejected, or the film carrier itself may be removed.

Further, although the compressor is used in the above-described example, the present invention is not limited to the same, and a fan may be provided. Incidentally, the abnormal state of the fan is determined by detecting the rotational speed of a fan motor by means of an encoder or the like and on the basis of whether or not the detected rotational speed has reached a necessary rotational speed after the turning on of the power supply.

Figure 12:
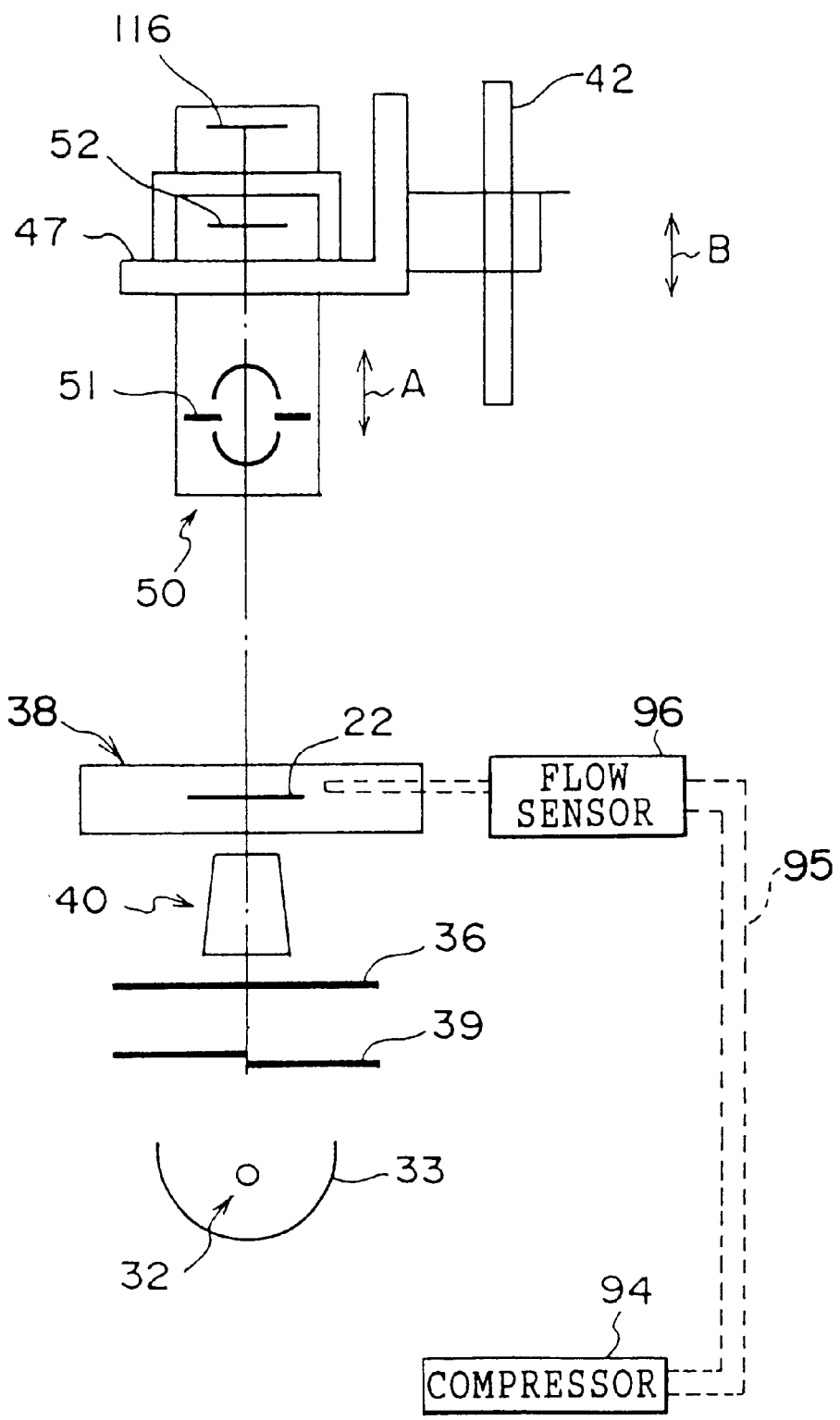
FIG. 12 is a diagram illustrating only the essential portions of a modification of the optical system of the line CCD scanner.
Figure 13A:
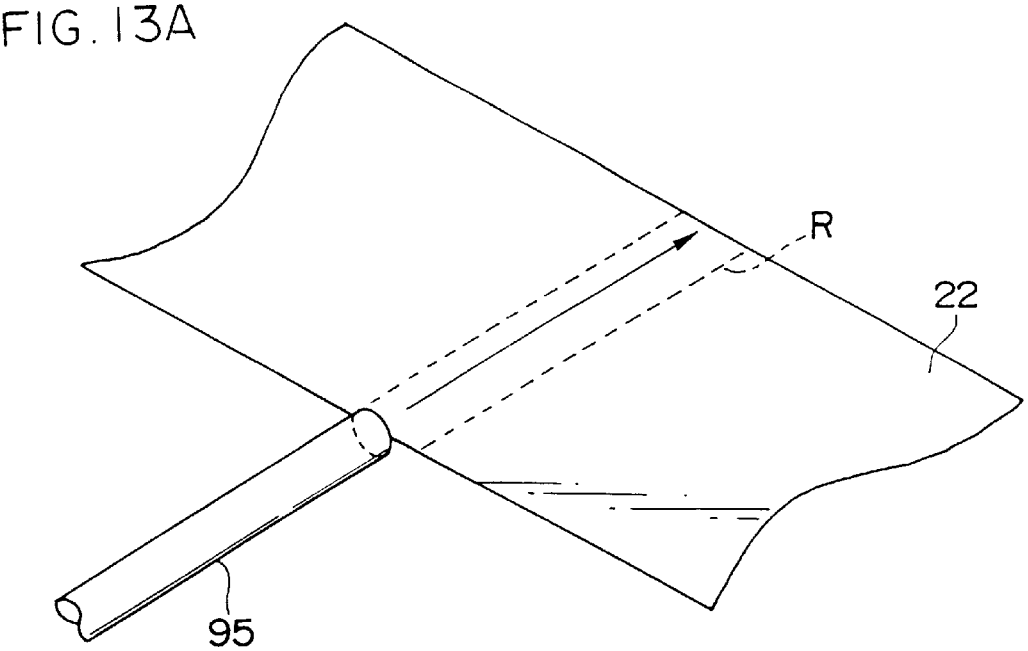
FIGS. 13A and 13B are a perspective view and a cross-sectional view illustrating one example of a guide tube.
Figure 13B:
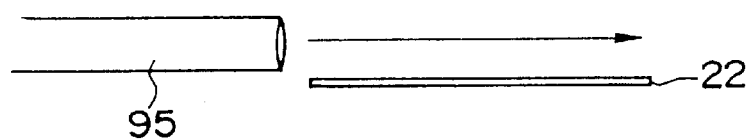
Figure 13C:
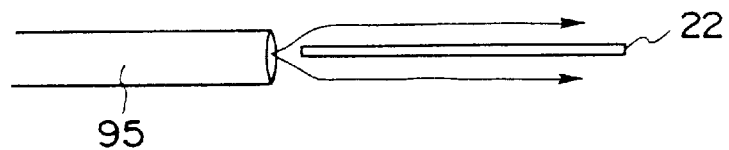
FIG. 13C is a cross-sectional view illustrating a modification of the guide tube.

In addition, although, in the above-described embodiment, the guide tube 95 guides to allow cooling air to be blown onto the photographic film from a diagonal direction, the present invention is not limited to the same. For example, an arrangement may be provided such that, as shown in FIGS. 12 and 13A, a distal end of the guide tube 95 is extended to reach the interior of the film carrier 38 (see FIG. 12), and guiding is effected such that cooling air flows in parallel with the reading region R of the photographic film 22 (see FIG. 13A). Namely, the guide tube 95 is located outside the photographic film 22 and is arranged in a direction perpendicular to the longitudinal direction of the photographic film 22 such that its leading end is located in the vicinity of the reading region R. Incidentally, guiding may be effected such that the cooling air flows in parallel with the reading region R on one surface side of the photographic film 22 as shown in FIG. 13B, or guiding may be effected such that the cooling air flows in parallel with the reading region R on both surface sides of the photographic film 22 as shown in FIG. 13C.

Figure 14:
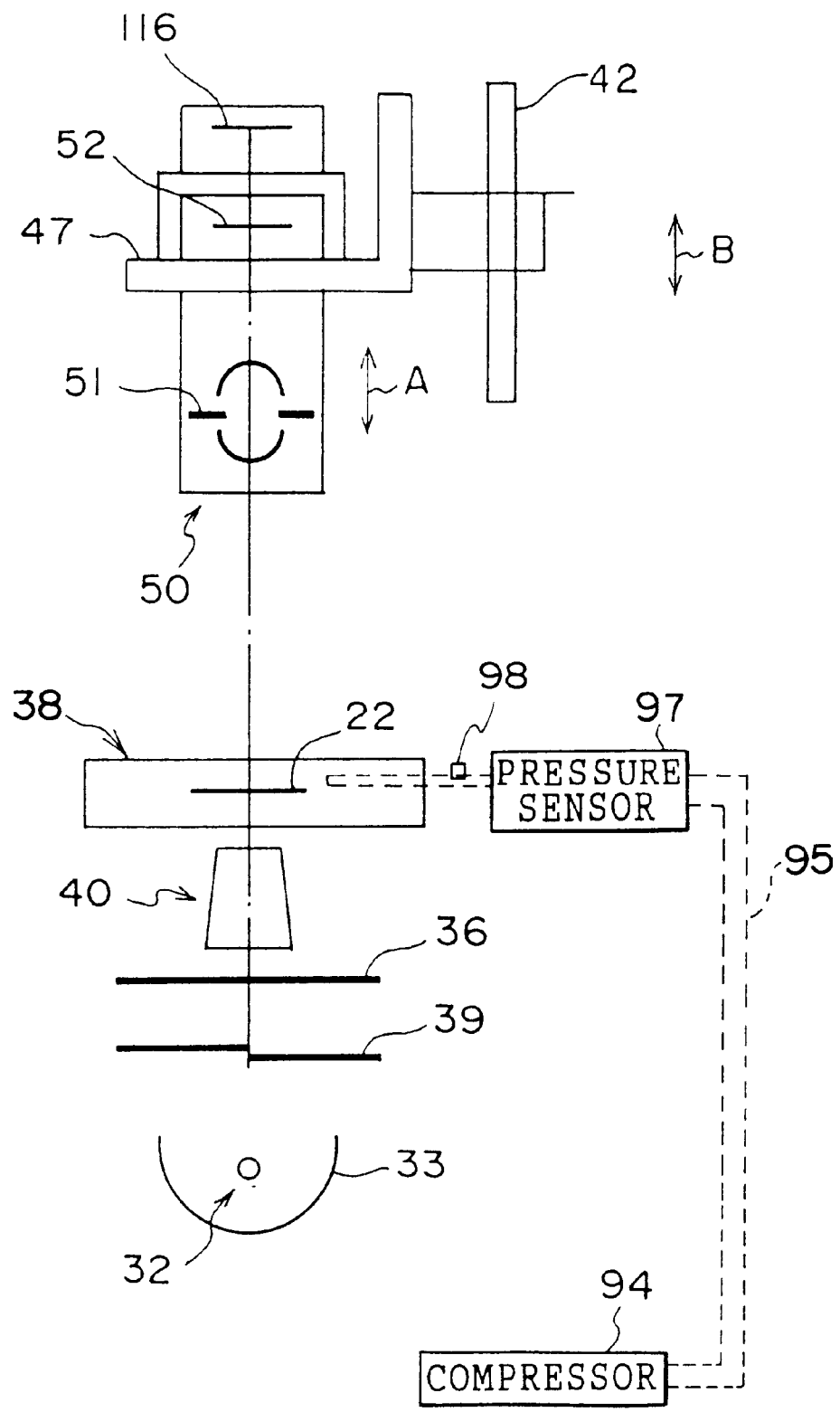
FIG. 14 is a diagram illustrating only the essential portions of the optical system of the line CCD scanner in a case where the temperature sensor for detecting the temperature of cooling air and the pressure sensor for detecting the pressure of cooling air are used in the example shown in FIG. 12.

In this example, in the case where, as described above, the pressure sensor 97 is provided instead of the flow sensor 96, and the temperature sensor 98 for detecting the state of the temperature of cooling air is provided, it is possible to provide an arrangement such as the one shown in FIG. 14. In this example, the cooling air outlet of the guide tube 95 (the tip of the guide tube 95) is located in the vicinity of the photographic film 22, and it is difficult to dispose the temperature sensor 98 in the vicinity of the air outlet. Therefore, in the example shown in FIG. 14, the temperature sensor 98 is provided midway in the guide tube 95 and at a position as close to the air outlet as possible.

Figure 15A:
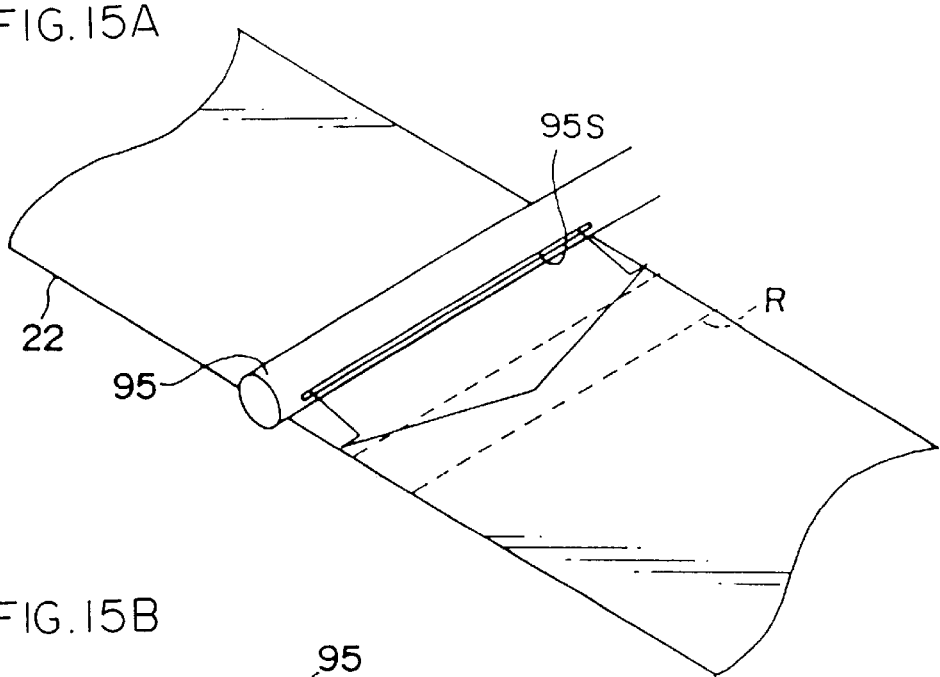
FIGS. 15A and 15B are a perspective view and a cross-sectional view illustrating another example of the guide tube.
Figure 15B:
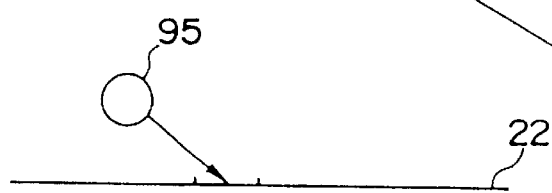
Figure 15C:
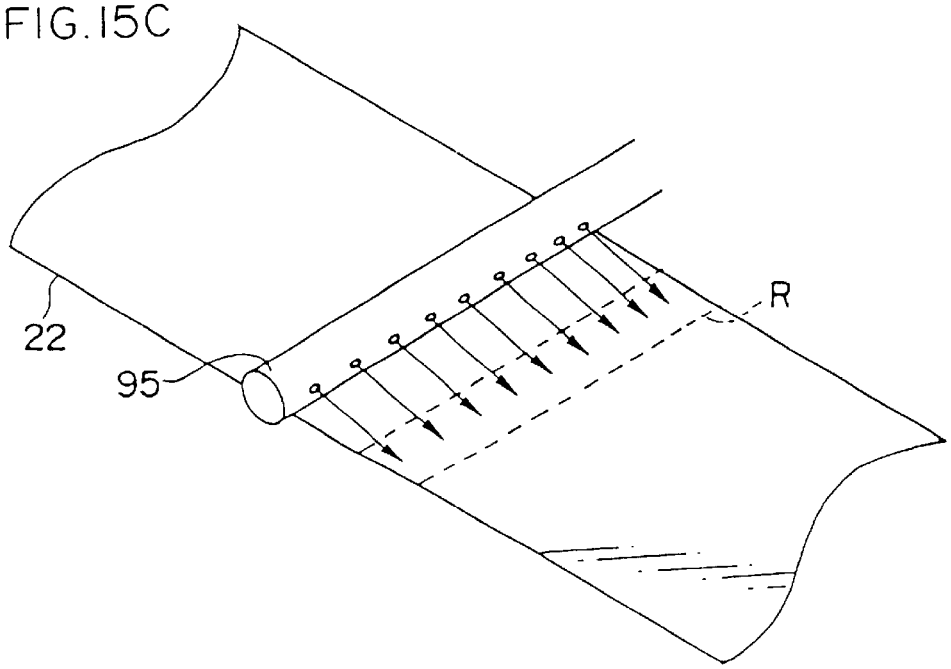
FIG. 15C is a cross-sectional view illustrating another modification of the guide tube.

In addition, as shown in FIGS. 15A and 15B, the guide tube 95 may be arranged to guide the cooling air over the entire reading region R of the photographic film 22 from a diagonal direction. Namely, the guide tube 95 is arranged at a position above the photographic film 22 in a direction perpendicular to the longitudinal direction of the photographic film 22, and a slit 95S extending along the reading region R is provided in a portion of the guide tube 95 which corresponds to the reading region R. Accordingly, through the slit 95S the cooling air is blown onto the entire reading region R of the photographic film 22 from the diagonal direction. It should be noted that the present invention is not limited to the slit 95S, and a plurality of holes may be provided in the portion of the guide tube 95 corresponding to the reading region R, as shown in FIG. 15C.

Figure 16:
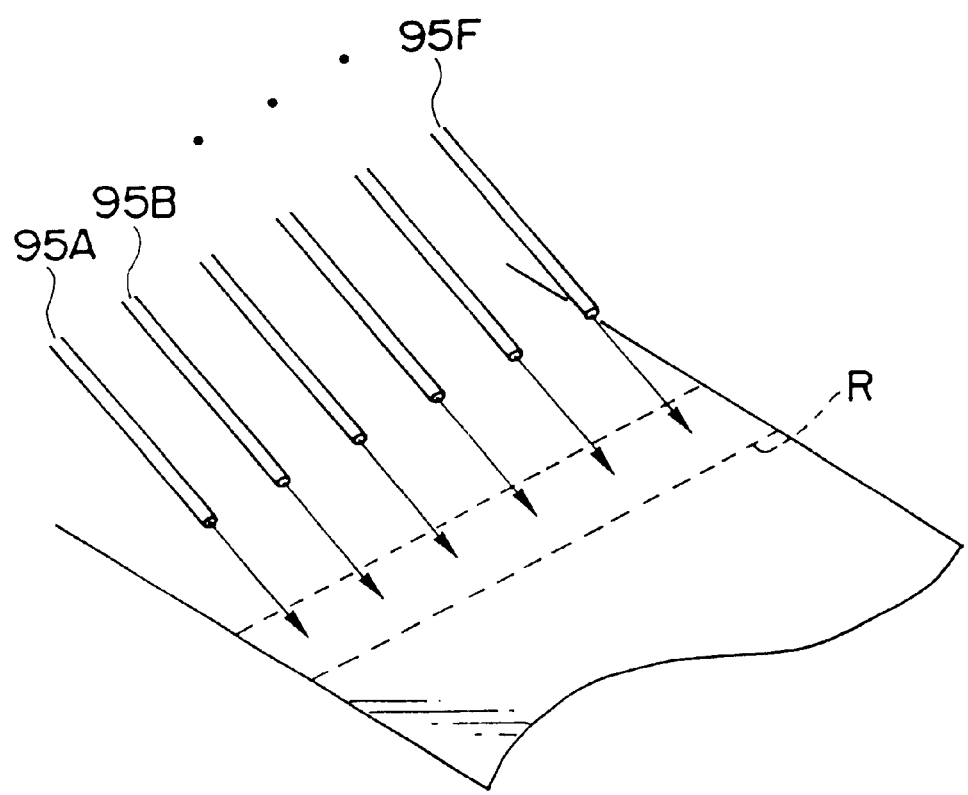
FIG. 16 is a perspective view illustrating still another example of the guide tube.

Further, the present invention is not limited to the provision of the slit 95S in the portion of the guide tube 95 corresponding to the reading region R. For example, as shown in FIG. 16, a plurality of tubes 95A, 95B, . . . , may be disposed at positions above the photographic film 22 in such a manner that their distal ends are direction toward the reading region R. Incidentally, the present invention is not limited to the provision of the plurality of tubes 95A, 95B, . . . , and a single tube may be disposed by being spaced apart a predetermined distance from the photographic film 22 in such a manner that the cooling air from that tube is blown onto the entire reading region R.

Figure 17:
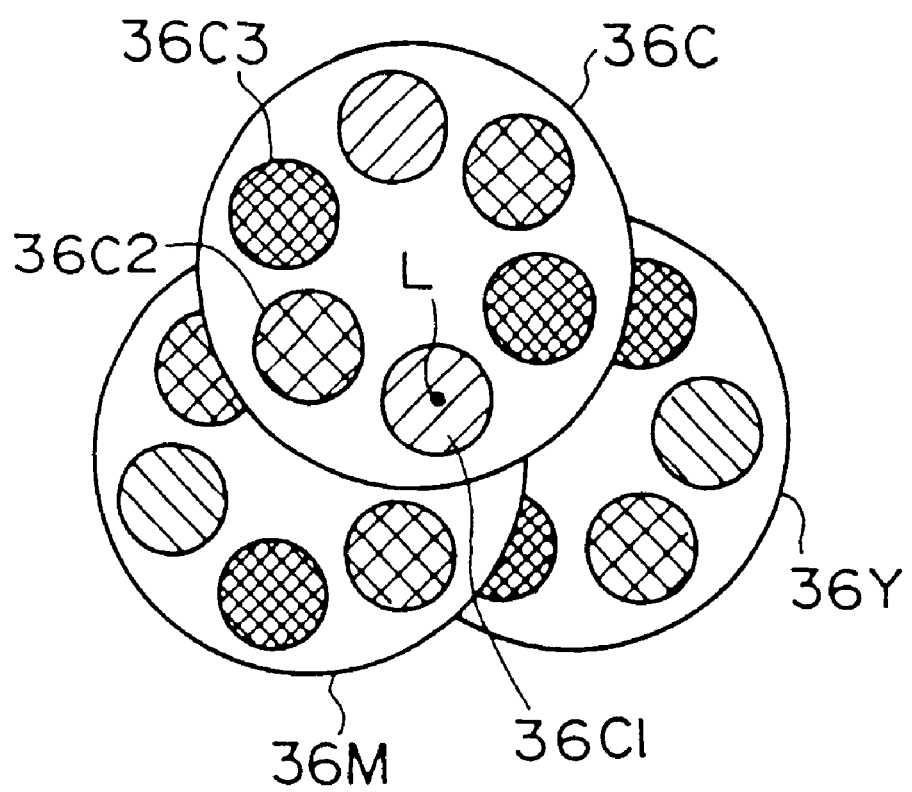
FIG. 17 is a diagram illustrating a modification of the turret.

The aforementioned balance filter is not limited to a single-piece arrangement (turret (see FIG. 4B)), and may be comprised of a turret 36C for a cyan filter for absorbing red light, a turret 36M for a magenta filter for absorbing green light, and a turret 36Y for a yellow filter for absorbing violet light, as shown in FIG. 17. A plurality of cyan filters 36C1, 36C2, and 36C3 having different densities are fitted in the turret 36C. The density is denser in the order of the cyan filters 36C1, 36C2, and 36C3. The other turrets 36M and 36Y are arranged similarly. The turrets 36C, 36M, and 36Y are rotatably supported such that the selected filters of the turrets overlap each other on the optical axis L.

In the above-described embodiment, a description has been given by citing the line CCD scanner (the image reading apparatus having a device for preventing the degeneration of a photographic photosensitive material) as an example, but the present invention is not limited to the same, and the device for preventing the degeneration of a photographic photosensitive material may be applied to a photographic exposure apparatus. Namely, the device for preventing the degeneration of a photographic photosensitive material may be applied to an analog printer (photographic exposure apparatus) in which while the photographic film and the photographic photosensitive material are being moved relative to each other, slit light from the photographic film is guided onto the photographic photosensitive material by a guiding means so as to slit-expose the photographic photosensitive material.

What is claimed is:

1. A device for preventing the degeneration of a photographic photosensitive material, comprising:
    an illuminating device for illuminating a photographic photosensitive material;
    a CCD device for detecting light illuminated through the photographic photosensitive material; and
    a detector for detecting an abnormal state leading to the degeneration of the photographic photosensitive material which has been illuminated by said illuminating device;
    wherein said detector detects whether or not at least one of a state of flow of cooling air blown onto the photographic photosensitive material, a state of transport of the photographic photosensitive material, a state of the temperature of the photographic photosensitive material, and a state of illumination by said illuminating device is abnormal.

2. The device for preventing the degeneration of a photographic photosensitive material according to claim 1, further comprising:
    a notification device for giving notice that an abnormal state exists.

3. The device for preventing the degeneration of a photographic photosensitive material according to claim 2, wherein said notification device gives notice that an abnormal state exists upon the initial occurrence of the abnormal state.

4. The device for preventing the degeneration of a photographic photosensitive material according to claim 1, wherein said cooling air blown onto the photographic photosensitive material is generated by a compressor.

5. The device for preventing the degeneration of a photographic photosensitive material according to claim 4, wherein said state of flow of cooling air blown onto the photographic photosensitive material includes the length of the cumulative operating time of said compressor.

6. The device for preventing the degeneration of a photographic photosensitive material according to claim 1, wherein said state of the temperature of the photographic photosensitive material includes the ambient temperature of a vicinity of said photographic photosensitive material for detecting an abnormal state.

7. The device for preventing the degeneration of a photographic photosensitive material according to claim 1, wherein said cooling air blown onto the photographic photosensitive material is detected by a flow sensor or a pressure sensor.

8. A device for preventing the degeneration of a photographic photosensitive material according to claim 1, where said illuminating device is turned off when the detector detects an abnormal state.

9. A device for preventing the degeneration of a photographic photosensitive material according to claim 1, where said CCD device comprises:
    a three-line CCD arrayed in a transporting direction and extending in a direction perpendicular to the transporting direction for reading an image; and
    a lens device for projecting the image onto said CCD.

10. A method for preventing the degeneration of a photographic photosensitive material, comprising the steps of:
    illuminating a photographic photosensitive material with light;
    detecting light illuminated through the photographic photosensitive material with a CCD device;
    detecting an abnormal state leading to the degeneration of the photographic photosensitive material which has been illuminated; and
    reducing a quantity of light applied to the photographic photosensitive material if an abnormal state is detected;
    wherein whether or not at least one of a state of flow of cooling air blown onto the photographic photosensitive material, a state of transport of the photographic photosensitive material, a state of the temperature of the photographic photosensitive material, a state of illumination, and an operational state in the reducing step is abnormal is detected.

11. The method for preventing the degeneration of a photographic photosensitive material according to claim 10, wherein said cooling air blown onto the photographic photosensitive material is generated by a compressor.

12. The method for preventing the degeneration of a photographic photosensitive material according to claim 11, wherein said state of flow of cooling air blown onto the photographic photosensitive material includes the length of the cumulative operating time of said compressor.

13. The method for preventing the degeneration of a photographic photosensitive material according to claim 10, wherein said state of the temperature of the photographic photosensitive material includes the ambient temperature of a vicinity of said photographic photosensitive material for detecting an abnormal state.

14. The method for preventing the degeneration of a photographic photosensitive material according to claim 10, wherein said cooling air blown onto the photographic photosensitive material is detected by a flow sensor or a pressure sensor.

15. A device for preventing the degeneration of a photographic photosensitive material, comprising: an illuminating device for illuminating a
    photographic photosensitive material; and
    a detector for detecting an abnormal state leading to the degeneration of the photographic photosensitive material which has been illuminated by said illuminating device;
    wherein a plurality of kinds of abnormal states, including those of a state of flow of cooling air blown onto the photographic photosensitive material, a state of the temperature of cooling air blown onto the photographic photosensitive material, a state of transport of the photographic photosensitive material, a state of the temperature of the photographic photosensitive material, and a state of illumination by said illuminating device are set as objects to be detected by said detector.

16. A device for preventing the degeneration of a photographic photosensitive material, comprising:

an illuminating device for illuminating a photographic photosensitive material;

a detector for detecting an abnormal state leading to the degeneration of the photographic photosensitive material which has been illuminated by said illuminating device; and a reducing device for reducing a quantity of light applied to the photographic photosensitive material if an abnormal state is detected by said detector;

wherein said reducing device reduces the quantity of light applied by controlling a transporting device for transporting the photographic photosensitive material in such a manner that the photographic photosensitive material is removed from a region illuminated by said illuminating device.

17. A device for preventing the degeneration of a photographic photosensitive material, comprising:

an illuminating device for illuminating a photographic photosensitive material;

a detector for detecting an abnormal state leading to the degeneration of the photographic photosensitive material which has been illuminated by said illuminating device; and a reducing device for reducing a quantity of light applied to the photographic photosensitive material if an abnormal state is detected by said detector;

wherein a plurality of kinds of abnormal states are set as objects to be detected by said detector, and said reducing device reduces the quantity of light applied by controlling a transporting device for transporting the photographic photosensitive material in such a manner that the photographic photosensitive material is removed from a region illuminated by said illuminating device if at least one of the plurality of kinds of abnormal states is detected by said detector.

18. An image reading apparatus comprising:

a device for preventing the degeneration of a photographic photosensitive material;

a transporting device for transporting the photographic photosensitive material; and a reading device for reading an image recorded on the photographic photosensitive material in a state in which the photographic photosensitive material is being transported by said transporting device;

wherein said device for preventing the degeneration of a photographic photosensitive material comprises an illuminating device for illuminating the photographic photosensitive material, and a detector for detecting an abnormal state leading to the degeneration of the photographic photosensitive material which has been illuminated by said illuminating device; and said reading device includes a three-line CCD arrayed in a transporting direction and extending in a direction perpendicular to the transporting direction for reading the image; and a lens device for projecting the image onto said CCD.

19. An image reading apparatus comprising:

a device for preventing the degeneration of a photographic photosensitive material;

a transporting device for transporting the photographic photosensitive material; and a reading device for reading an image recorded on the photographic photosensitive material in a state in which the photographic photosensitive material is being transported by said transporting device;

wherein said device for preventing the degeneration of a photographic photosensitive material comprises an illuminating device for illuminating the photographic photosensitive material, and a detector for detecting an abnormal state leading to the degeneration of the photographic photosensitive material which has been illuminated by said illuminating device, and a plurality of kinds of abnormal states are set as objects to be detected by said detector.

20. The image reading apparatus according to claim 19, wherein said reading device includes a three-line CCD arrayed in a transporting direction and extending in a direction perpendicular to the transporting direction for reading the image; and a lens device for projecting the image onto said CCD.

21. A method for preventing the degeneration of a photographic photosensitive material, comprising the steps of:

illuminating a photographic photosensitive material with light;

detecting an abnormal state leading to the degeneration of the photographic photosensitive material which has been illuminated; and reducing a quantity of light applied to the photographic photosensitive material if an abnormal state is detected;

wherein, in the detection of an abnormal state, a plurality of kinds of abnormal states, including those of a state of flow of cooling air blown onto the photographic photosensitive material, a state of the temperature of cooling air blown onto the photographic photosensitive material, a state of transport of the photographic photosensitive material, a state of the temperature of the photographic photosensitive material, a state of illumination, and an operational state in the reducing step, are set as objects to be detected, and the quantity of light applied to the photographic photosensitive material is reduced if at least one of the plurality of kinds of abnormal states is detected.

22. A method for preventing the degeneration of a photographic photosensitive material, comprising the steps of:

illuminating a photographic photosensitive material with light;

detecting an abnormal state leading to the degeneration of the photographic photosensitive material which has been illuminated; and reducing a quantity of light applied to the photographic photosensitive material if an abnormal state is detected;

wherein the quantity of light applied to the photographic photosensitive material is reduced by causing the photographic photosensitive material to be removed from a region illuminated with light.

23. A method for preventing the degeneration of a photographic photosensitive material, comprising the steps of:

illuminating a photographic photosensitive material with light;

detecting an abnormal state leading to the degeneration of the photographic photosensitive material which has been illuminated; and reducing a quantity of light applied to the photographic photosensitive material if an abnormal state is detected;

wherein, in the detection of an abnormal state, a plurality of kinds of abnormal states are set as objects to be detected, and the quantity of light applied to the photographic photosensitive material is reduced by causing the photographic photosensitive material to be removed from a region illuminated with light if at least one of the plurality of kinds of abnormal states is detected.

24. A device for preventing the degeneration of a photographic photosensitive material, comprising:

a light source section for illuminating a photographic film; and a detector for detecting an abnormal state leading to the degeneration of the photographic film which has been illuminated by said light source section;

wherein said detector detects whether or not at least one of a state of the temperature of the photographic film, an illuminating state of said light source section, a state of closure of a casing of said light source section, and an operational state of a microprocessor is abnormal.

25. A method for preventing the degeneration of a photographic photosensitive material, comprising the steps of:

illuminating a photographic film with light by a light source section;

detecting an abnormal state leading to the degeneration of the photographic film which has been illuminated; and reducing a quantity of light applied to the photographic film by a microprocessor if an abnormal state is detected;

wherein whether or not at least one of a state of the temperature of the photographic film, an illuminating state of said light source section, a state of closure of a casing of said light source section, and an operational state of said microprocessor is abnormal is detected.

26. A device for preventing the degeneration of a photographic photosensitive material, comprising:

an illuminating device for illuminating a photographic photosensitive material;

a CCD device for detecting light illuminated through the photographic photosensitive material;

a detector for detecting an abnormal state leading to the degeneration of the photographic photosensitive material which has been illuminated by said illuminating device; and a reducing device for reducing a quantity of light applied to the photographic photosensitive material;

wherein said detector detects whether or not at least one of a state of flow of cooling air blown onto the photographic photosensitive material, a state of transport of the photographic photosensitive material, a state of the temperature of the photographic photosensitive material, a state of illumination by said illuminating device, and an operational state of said reducing device is abnormal.

27. The device for preventing the degeneration of a photographic photosensitive material according to claim 26, wherein said reducing device reduces a quantity of light applied to the photographic photosensitive material if an abnormal state is detected by said detector.

28. The device for preventing the degeneration of a photographic photosensitive material according to claim 26, wherein said reducing device has a diaphragm device for stopping down the quantity of light applied to the photographic photosensitive material, and reduces the quantity of light applied if the stopped-down state of said diaphragm device is such that the quantity of light applied to the photographic photosensitive material is in a state of such a quantity that the photographic photosensitive material degenerates, and if an abnormal state is detected by said detector.

29. The device for preventing the degeneration of a photographic photosensitive material according to claim 28, wherein said detector detects whether or not at least a state of flow of cooling air blown onto the photographic photosensitive material and a state of transport of the photographic photosensitive material are abnormal, and said reducing device reduces the quantity of light applied if the stopped-down state of said diaphragm device is such that the quantity of light applied to the photographic photosensitive material is in a state of such a quantity that the photographic photosensitive material degenerates, and if it is detected by said detector that at least one of the state of flow and the state of transport is abnormal.

30. A device for preventing the degeneration of a photographic photosensitive material, comprising:

an illuminating device for illuminating a photographic photosensitive material;

a detector for detecting an abnormal state leading to the degeneration of the photographic photosensitive material which has been illuminated by said illuminating device; and a reducing device for reducing a quantity of light applied to the photographic photosensitive material;

wherein a plurality of kinds of abnormal states, including those of a state of flow of cooling air blown onto the photographic photosensitive material, a state of the temperature of cooling air blown onto the photographic photosensitive material, a state of transport of the photographic photosensitive material, a state of the temperature of the photographic photosensitive material, a state of illumination by said illuminating device, and an operational state of said reducing device, are set as objects to be detected by said detector.

31. The device for preventing the degeneration of a photographic photosensitive material according to claim 30, wherein said reducing device reduces a quantity of light applied if at least one of the plurality of kinds of abnormal states is detected by said detector.

32. The device for preventing the degeneration of a photographic photosensitive material according to claim 30, wherein said reducing device has a diaphragm device for stopping down the quantity of light applied to the photographic photosensitive material, and reduces the quantity of light applied if the stopped-down state of said diaphragm device is such that the quantity of light applied to the photographic photosensitive material is in a state of such a quantity that the photographic photosensitive material degenerates, and if an abnormal state is detected by said detector.

33. The device for preventing the degeneration of a photographic photosensitive material according to claim 32, wherein said detector detects whether or not at least a state of flow of cooling air blown onto the photographic photosensitive material and a state of transport of the photographic photosensitive material are abnormal, and said reducing device reduces the quantity of light applied if the stopped-down state of said diaphragm device is such that the quantity of light applied to the photographic photosensitive material is in a state of such a quantity that the photographic photosensitive material degenerates, and if it is detected by said detector that at least one of the state of flow and the state of transport is abnormal.

34. A method for preventing the degeneration of a photographic photosensitive material, comprising the steps of:

illuminating a photographic photosensitive material with light; and detecting an abnormal state leading to the degeneration of the photographic photosensitive material which has been illuminated, wherein whether or not at least one of a state of flow of cooling air blown onto the photographic photosensitive material, a state of the temperature of the photographic photosensitive material, and a state of illumination is abnormal is detected.

35. A device for preventing the degeneration of a photographic photosensitive material, comprising:

an illuminating device for illuminating a photographic photosensitive material; and a detector for detecting an abnormal state leading to the degeneration of the photographic photosensitive material which has been illuminated by said illuminating device;

wherein said detector detects whether or not at least one of a state of flow of cooling air blown onto the photographic photosensitive material, a state of the temperature of the photographic photosensitive material, and a state of illumination by said illuminating device is abnormal.

* * * * *